United States Patent
Ishizuka et al.

(10) Patent No.: US 7,348,369 B2
(45) Date of Patent: Mar. 25, 2008

(54) COLORED FINE PARTICLE DISPERSION, INK USING THE SAME, AND INK-JET RECORDING METHOD

(75) Inventors: Takahiro Ishizuka, Kanagawa (JP); Kenji Ikeda, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 295 days.

(21) Appl. No.: 10/831,212

(22) Filed: Apr. 26, 2004

(65) Prior Publication Data
US 2004/0221767 A1 Nov. 11, 2004

(30) Foreign Application Priority Data
Apr. 25, 2003 (JP) ............................. 2003-121604

(51) Int. Cl.
*C09D 11/00* (2006.01)
(52) U.S. Cl. ............... 523/160; 523/161; 523/200; 523/205; 524/504; 524/505; 106/31.27
(58) Field of Classification Search ............. 523/160, 523/161, 200, 205; 524/504, 505; 106/31.27
See application file for complete search history.

(56) References Cited

U.S. PATENT DOCUMENTS

| | | | | |
|---|---|---|---|---|
| 4,728,707 A | * | 3/1988 | Amimoto et al. | 526/243 |
| 5,302,437 A | * | 4/1994 | Idei et al. | 428/32.22 |
| 5,302,654 A | * | 4/1994 | Ishii et al. | 524/458 |
| 5,631,309 A | * | 5/1997 | Yanagi et al. | 523/160 |
| 5,814,685 A | * | 9/1998 | Satake et al. | 523/201 |
| 6,235,096 B1 | * | 5/2001 | Meyrick et al. | 106/31.43 |
| 2002/0032252 A1 | * | 3/2002 | Ishizuka | 523/160 |
| 2004/0010052 A1 | * | 1/2004 | Ishizuka et al. | 522/75 |
| 2004/0024085 A1 | * | 2/2004 | Ishizuka et al. | 523/160 |

FOREIGN PATENT DOCUMENTS

| JP | 62-241901 A | 10/1987 |
|---|---|---|
| JP | 2001-123097 A | 5/2001 |

* cited by examiner

*Primary Examiner*—Bernard Lipman
(74) *Attorney, Agent, or Firm*—Sughrue Mion, PLLC

(57) ABSTRACT

The invention provides a colored fine particle dispersion wherein colored fine particles including a dispersible polymer having both of a hydrophilic polymer moiety and a hydrophobic polymer moiety which has a glass transition temperature (Tg) of 0° C. or less and an oil-soluble dye are dispersed in an aqueous medium; an ink using the same; and an ink-jet recording method using the ink. Preferably, a content of the hydrophobic polymer moiety is from 60 to 90% by mass, and a content of the hydrophilic polymer moiety is from 10 to 40% by mass.

17 Claims, No Drawings

COLORED FINE PARTICLE DISPERSION, INK USING THE SAME, AND INK-JET RECORDING METHOD

CROSS-REFERENCE TO RELATED APPLICATION

This application claims priority under 35 USC 119 from Japanese Patent Application No. 2003-121604, the disclosure of which is incorporated by reference herein.

BACKGROUND OF THE INVENTION

1. Field of the Invention

The present invention relates to an aqueous colored fine particle dispersion comprising an oil-soluble dye, an ink comprising the colored fine particle dispersion, and an ink-jet recording method using the ink.

2. Description of the Related Art

In recent years, with the spread of computers, ink-jet printers have widely been used to print images on paper, films, cloth or the like not only in offices but also at home. As ink-jet recording inks, oily inks, aqueous inks, and solid inks are known. Of these inks, aqueous inks are advantageous and are the main current from the standpoints of ease of production, handling performance, odor, safety and the like.

Since many types of aqueous inks use water-soluble dye which is dissolved in a molecular state, the inks are high in clearness and color density. However, the inks have the following drawbacks: (1) since the dye is water-soluble, the water resistance thereof is poor, whereby, at the time of printing images on the so-called plain paper with the ink, bleeding is generated to deteriorate print quality remarkably; (2) the light fastness of the inks is poor; and (3) the storability of images resulting from the inks is remarkably poor due to the effect of an oxidizing gas (such as $SO_x$, $NO_x$, or ozone) in recording paper in which an ink-receiving layer containing porous inorganic fine particles is formed on its surface (hereinafter, sometimes referred to as "photographic image-quality paper").

Thus, aqueous inks using pigment or disperse dye have been suggested to solve the above-mentioned problems (see, for example, Japanese Patent Application Laid-Open (JP-A) No. 56-157468). Although the water resistance of these aqueous inks is improved to some degree, it cannot be said to be sufficient. The pigment or disperse dye dispersed in the aqueous inks is lacking in storage stability so as to cause such a problem that clogging occurs easily in nozzles for jetting the inks. Furthermore, the inks using the pigment or dye do not infiltrate photographic image-quality paper sufficiently, so as to cause a problem in that when the paper is rubbed with fingers, the pigment or the dye peels off easily from the surface thereof.

Methods of encompassing an oil-soluble dye in a polymer have been suggested (see, for example, JP-A Nos. 58-45272 and 62-241901). However, the inks obtained by the methods have insufficient color tone, color reproducibility and image durability against, in particular, oxidizing gas or the like. When images are printed on photographic image-quality paper with the inks, the abrasion resistance thereof is insufficient. Inks having excellent coloring forming property and abrasion resistance due to the introduction of a salt-forming group and a polyalkylene oxide group into a polymer have been suggested (see, for example, JP-A No. 2001-123097). The inks have a good resistance against rubbing by fingers, but do not have a high-level abrasion resistance, such as a resistance against rubbing with an eraser. Methods of using a high-boiling-point organic solvent and a dye in ink to improve the color tone or abrasion resistance of images resulting from the ink have been suggested (see, for example, JP-A No. 2001-262018). However, the exhibited properties are insufficient in cases where high-level the image durability is required.

As described above, under the present circumstances, the following colored fine particle dispersion has not yet been provided: a colored fine particle dispersion which has good handling performance, low odor-generating properties and high safety, which has dispersed particles of a small particle size, and which is excellent in dispersion stability and storage stability, this colored fine particle dispersion therefore being capable of producing the following advantages when the dispersion is applied to ink: the ink causes no clogging in the tips of nozzles to exhibit good jetting stability; the ink is good in color forming ability and color tones (hue) without depending upon kinds of paper; the ink is good in ink permeability even when the ink is used for the photographic image-quality paper; after the ink is used to print images, the images exhibit good water resistance, and in particular, good image storability and abrasion resistance; and the ink makes high-density and high-quality printing possible.

The invention overcomes the above-mentioned problems in the prior art and can attain the following objects.

One object of the invention is to provide a colored fine particle dispersion which has good handling performance, low odor-generating properties and high safety; which is suitable for aqueous ink for writing, aqueous ink for printing and ink for information-recording; which has dispersed perticles of a small particle size; and which is excellent in dispersion stability and storage stability.

Another object of the invention is to provide an ink-jet recording ink which is suitable for thermal piezoelectric, electric field, and acoustic ink-jet methods; which has good handling performance, low odor-generating properties and high safety; which has dispersed particles of a small particle size; which is excellent in dispersion stability and storage stability so as to decrease the generation of clogging in the tips of nozzles; which has no dependency upon kinds of paper so as to exhibit excellent color forming property and color tones when the ink is used to print images on paper selected at will; which is excellent in inkpermeability into photographic image-quality paper; which gives good water resistance, and in particular, good image storability and abrasion resistance to images printed with the ink; and which makes high-density and high-quality recording possible.

Still another object of the invention is to provide an ink-jet recording method which has good handling performance, low odor-generating property and high safety; which overcomes defectivejetting due to clogging of the tips of nozzles; which has no dependency upon kinds of paper so as to exhibit excellent color forming properties and color tones when the ink is used to print images on paper selected at will; which is excellent in ink permeability into photographic image-quality paper; which gives good water resistance, and in particular, good image storability and abrasion resistance to images printed with the ink; and which makes high-density and high-quality recording possible.

SUMMARY OF THE INVENTION

In order to solve the above-mentioned problems, a first aspect of the present invention is to provide a colored fine particle dispersion, wherein colored fine particles comprising a dispersible polymer having both of a hydrophilic polymer moiety and a hydrophobic polymer moiety which has a glass transition temperature (Tg) of 0° C. or less and an oil-soluble dye are dispersed in an aqueous medium. A second aspect of the invention is to provide an ink comprising a colored fine particle dispersion wherein colored fine particles comprising a dispersible polymer having both of a hydrophilic polymer moiety and a hydrophobic polymer moiety which has a glass transition temperature (Tg) of 0° C. or less and an oil-soluble dye are dispersed in an aqueous medium.

A third aspect of the invention is to provide an ink-jet recording method for recording an image onto a recording material with an ink comprising a colored fine particle dispersion wherein colored fine particles comprising a dispersible polymer having both of a hydrophilic polymer moiety and a hydrophobic polymer moiety which has a glass transition temperature (Tg) of 0° C. or less and an oil-soluble dye are dispersed in an aqueous medium.

DETAILED DESCRIPTION OF THE INVENTION

The colored fine particle dispersion, the ink and the ink-jet recording method of the present invention are described hereinafter.

(Colored Fine Particle Dispersion)

The colored fine particle dispersion of the invention is a dispersion wherein colored fine particles comprising a dispersible polymer and an oil-soluble dye are dispersed in an aqueous medium, and the colored fine particle dispersion may comprise a hydrophobic high-boiling-point organic solvent having a boiling point of 150° C. or more.

More specifically, the colored fine particle dispersion is in a so-called emulsion/dispersion state wherein a dispersible polymer, an oil-soluble dye and optional other components (such as a hydrophobic high-boiling-point organic solvent and other colorants) are dispersed, as oil droplets in the form of fine particles, in an aqueous medium.

The "aqueous medium" in the invention means water, or a mixture of water and a small amount of a water-miscible organic solvent to which an additive and so on are added if necessary.

—Dispersible Polymer—

The dispersible polymer is described in detail. The dispersible polymer comprises a hydrophobic polymer moiety and a hydrophilic polymer moiety. The arrangement of the hydrophobic polymer moiety and the hydrophilic polymer moiety is arbitrary. Preferable is a polymer wherein the hydrophilic polymer moiety is positioned at the terminal of the polymer or at a side chain thereof, for example, a graft copolymer having a side chain made of the hydrophilic polymer moiety or a block copolymer having, at the terminal thereof, the hydrophilic polymer moiety. The dispersible polymer may be a polymer obtained by any known polymerization method, such as a vinyl polymer or a condensed type polymer (such as polyurethane, polyester, polyamide, polyurea or polycarbonate). The vinyl polymer is preferable since the structure of the polymer can easily be controlled. It is preferable that the ratio of the hydrophobic polymer moiety in the dispersible polymer is from 60 to 90% by mass and the ratio of the hydrophilic polymer moiety therein is from 10 to 40% by mass. It is also preferable that the hydrophilic polymer moiety is made of an anionic polymer or a nonionic polymer.

The hydrophobic polymer moiety is a polymer moiety such that when a polymer made of the hydrophobic moiety is produced, the polymer is neither dissolved nor dispersed in water. In order to cause the hydrophobic polymer moiety to have abrasion resistance, the glass transition temperature (Tg) thereof is 0° C. or less. The Tg is preferably −15° C. or less, more preferably −30° C. or less, even more preferably −40° C.

In the case that the Tg is more than 0° C., an image recorded with the ink on photographic image-quality paper, which does not have sufficient abrasion resistance, has an insufficient abrasion resistance. Thus, this case is not preferable.

Examples of the monomer which constitutes the hydrophobic polymer moiety include:

acrylic acid esters and methacrylic acid esters (the ester group thereof being a substituted or unsubstituted aliphatic group or a substituted or unsubstituted aromatic group, such as a methyl, ethyl, n-propyl, isopropyl, n-butyl, isobutyl, sec-butyl, tert-butyl, amyl, hexyl, 2-ethylhexyl, tert-octyl, 2-chloroethyl, 4-bromobutyl, cyanoethyl, cyclohexyl, benzyl, butoxymethyl, 3-methoxybutyl, 2-(2-methoxyethoxy)ethyl, 2-(2-butoxyethoxy)ethyl, 2,2,2-tetrafluoroethyl, 1H,1H,2H,2H-perfluorodecyl, 4-butylphenyl, phenyl, 2,4,5-tetramethylphenyl, or 4-chlorophenyl group);

acrylamides and methacrylamides, specific examples thereof including N-monosubstituted acrylamides, N-disubstituted acrylamides, N-monosubstituted methacrylamides, and N-disubstituted methacrylamides (the substituent thereof being a substituted or unsubstituted aliphatic group or a substituted or unsubstituted aromatic group, such as a methyl, ethyl, n-propyl, isopropyl, n-butyl, isobutyl, sec-butyl, tert-butyl, pentyl, hexyl, 2-ethylhexyl, tert-octyl, cyclohexyl, benzyl, alkoxymethyl, alkoxyethyl, 4-butylphenyl, phenyl, 2,4,5-tetramethylphenyl, or 4-chlorophenyl group);

olefins, specific examples thereof including dicyclopentadiene, ethylene, propylene, 1-butene, 1-pentene, vinyl chloride, vinylidene chloride, isoprene, chloroprene, butadiene, and 2,3-dimethylbutadiene; styrenes, specific examples thereof including styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, and methyl vinylbenoate;

vinyl ethers, specific examples thereof including methyl vinyl ether, butyl vinyl ether, hexyl vinyl ether and methoxyethyl vinyl ether; and other monomers, specific examples thereof including butyl crotonate, hexyl crotonate, dimethyl itaconate, dibutyl itaconate, diethyl maleate, dimethyl maleate, dibutyl maleate, diethyl fumarate, dimethyl fumarate, dibutyl fumarate, methyl vinyl ketone, phenyl vinyl ketone, methoxyethyl vinyl ketone, N-vinyloxazolidone, N-vinylpyrrolidone, vinylidene chloride, methylenemalonenitrile, vinylidene, diphenyl-2-acryloyloxyethyl phosphate, diphenyl-2-methacryloyloxyethyl phosphate, dibutyl-2-acryloyloxyethyl phosphate, and dioctyl-2-methacryloyloxyethyl phosphate.

Of these examples, preferable are acrylic acid esters and methacrylic acid esters wherein the ester group is an unsubstituted aliphatic group, an alkyl-substituted aromatic group or an aromatic group, N-monosubstituted acrylamides, N-disubstituted acrylamides, N-monosubstituted methacrylamides and N-disubstituted methacrylamides wherein the substituent(s) is/are one or two selected from unsubstituted aliphatic groups, alkyl-substituted phenyl groups, and a phenyl group. More preferable are acrylic acid esters and methacrylic acid esters wherein the ester group is an aliphatic group having 1 to 20 carbon atoms, an alkyl-substituted aromatic group having 7 to 30 carbon atoms, or an aromatic group. Even more preferable are acrylic acid esters and methacrylic acid esters wherein the ester group is an aliphatic group having 1 to 20 carbon atoms, an alkyl-substituted phenyl having 7 to 30 carbon atoms, or a phenyl group. Even more preferable are acrylic acid esters and methacrylic acid esters wherein the ester group is an aliphatic group having 2 to 20 carbon atoms. Even more preferable are hexyl methacrylate, 2-ethylhexyl methacrylate, butyl acrylate, isobutyl acrylate, s-butyl acrylate, ethyl acrylate, propyl acrylate, hexyl acrylate, and 2-ethylhexyl acrylate. Even more preferable are hexyl methacrylate, butyl acrylate, isobutyl acrylate, s-butyl acrylate, propyl acrylate, and hexyl acrylate.

If the Tg of the hydrophobic polymer moiety becomes 0° C. or less, the moiety may be made of one constituent material, or may be composed of two or more constituent materials for various purposes (for example, adjustment of the solubility or compatibility with the oil-soluble dye of the moiety, the stability of the dispersion, or other properties).

The hydrophilic polymer moiety is a polymer moiety such that when a polymer made of the hydrophilic polymer moiety is produced, the polymer is dissolved in water. The hydrophilic polymer moiety may be of a cationic, anionic or nonionic type, or of a type of combination of these types, and is preferably of an anionic or nonionic type, or of a type of combination of these types. An anionic or nonionic hydrophilic polymer moiety is particularly preferable since the moiety keeps high stability under neutral or basic conditions, which are general for ink.

Examples of the cationic polymer moiety include polymers having a cationic dissociating group such as a tertiary amino or pyridine group. Examples of the anionic polymer moiety include polymers having an anionic dissociating group such as a carboxylic acid or sulfonic acid group. Examples of the nonionic polymer moiety include polymers having a nonionic dispersible group such as an ethyleneoxy, alcohol or pyrrolidone group.

Examples of the monomer or polymer constituent unit which constitutes the hydrophilic polymer include monomers having an acid group such as a carboxyl or sulfo group (such as acrylic acid, methacrylic acid, 2-acrylamide-2-methylpropanesulfonic acid, and 2-carboxyethyl acrylate), acrylic acid esters and methacrylic acid esters having, at the ester moiety thereof, a hydrophilic substituent (examples of the hydrophilic substituent including hydroxyl, carboxyl, and amino groups), acrylamide, methacrylamide, N-monosubstituted acrylamides, N-disubstituted acrylamides, N-monosubstituted methacrylamides, N-disubstituted methacrylamides, vinylpyrrolidone, a polyethylene oxide moiety, a polyvinyl alcohol moiety, and polyhydric alcohol moieties such as sugar and glycerin.

Of these examples, preferable are acrylic acid, methacrylic acid, 2-carboxyethyl acrylate, acrylic acid esters and methacrylic acid esters having a hydroxy group (examples of the ester group having the hydroxyl group including 2-hydroxyethyl and 2,3-dihydroxypropyl groups), acrylamide, N-monosubstituted acrylamides, N-disubstituted acrylamides, N-monosubstituted methacrylamides and N-disubstituted methacrylamides wherein the total number of the carbon atoms of the substituent(s) at the nitrogen atom is from 1 to 4, a polyethylene oxide moiety, a polyvinyl alcohol moiety, and polyhydric alcohol moieties such as sugar and glycerin. More preferable are acrylic acid, methacrylic acid, 2-carboxyethyl acrylate, 2-hydroxyethyl acrylate, 2-hydroxyethyl methacrylate, 2,3-dihydroxypropyl acrylate, and 2,3-dihydroxypropyl methacrylate. Even more preferable are acrylic acid, methacrylic acid, 2-hydroxyethyl acrylate, 2,3-dihhydroxypropyl acrylate, 2,3-dihydroxypropyl methacrylate, a polyethylene oxide moiety, and a polyvinyl alcohol moiety.

Even more preferable are 2,3-dihhydroxypropyl acrylate, 2,3-dihydroxypropyl methacrylate, and a polyethylene oxide moiety.

As long as the hydrophilic polymer moiety functions as a hydrophilic moiety, the moiety may be made of one constituent material, or may be made of two or more constituent materials for various purposes (for example, adjustment of the stability of each of the constituent materials in the dispersion, the solubility of the polymer for producing the dispersion, or some other property).

The content of each of the hydrophobic polymer moiety and the hydrophilic polymer moiety in the dispersible polymer can be arbitrarily used, depending on the nature of each of the moieties (for example, the degree of the hydrophilicity of the hydrophilic polymer moiety or the degree of the hydrophobicity of the hydrophobic polymer moiety). Since it is necessary that the oil-soluble dye is dissolved in the hydrophobic polymer moiety, the hydrophobic polymer moiety is from 60 to 90% by mass and the hydrophilic polymer moiety is from 10 to 40% by mass, more preferably, the hydrophobic polymer moiety is from 60 to 85% by mass and the hydrophilic polymer moiety is from 15 to 40% by mass, respectively, and even more preferably the hydrophobic polymer moiety is from 60 to 80% by mass and the hydrophilic moiety is from 20 to 40% by mass, respectively.

In the case that the hydrophilic polymer moiety has the above-mentioned anionic dissociating group, the content of the dissociating group is preferably from 0.1 to 3.0 mmol/g, more preferably from 0.2 to 2.0 mmol/g. If the content of the dissociating group is small, the self-emulsifying ability of the polymer is small. If the content is large, the water-solubility thereof becomes high so that the polymer tends to be unsuitable for the dispersion of the dye therein.

Regarding the dissociating group, the cationic dissociating group may be an alkali metal salt (such as Na or K) or an ammonium ion salt, and the anionic dissociating group may be a salt of an organic acid (such as acetic acid, propionic acid, or methanesulfonic acid) or an inorganic acid (such as hydrochloric acid or sulfuric acid).

The weight-average molecular weight (Mw) of the dispersible polymer is generally from 1,000 to 200,000, preferably from 2,000 to 50,000. If the molecular weight is less than 1,000, it tends to be difficult to obtain a stable colored fine particle dispersion. If the molecular weight is more than 200,000, the solubility of the polymer in organic solvent tends to deteriorate or the viscosity of the organic solution containing the polymer tends to increase so that the colored fine particles are not easily dispersed.

Specific examples of the dispersible polymer are listed up below. Ratios in parentheses represent ratios by mass. In the invention, the polymer is not limited to these specific examples.

PA-1) Copolymer of butyl acrylate/methacrylic acid ester of polyethylene glycol monomethyl ether (the number of recurring ethyleneoxy chains: about 23) (60:40)

PA-2) Copolymer of hexyl methacrylate/2,3-dihydroxypropyl acrylate (85:15)

PA-3) Copolymer of isobutyl acrylate/methacrylic acid ester of polyethylene glycol monomethyl ether (the number of recurring ethyleneoxy chains: about 45) (70:30)

PA4) Copolymer of s-butyl acrylate/2,3-dihydroxypropyl methacrylate (82:18)

PA-5) Copolymer of hexyl methacrylate/2-carboxyethyl acrylate/methacrylic acid ester of polyethylene glycol monomethyl ether (the number of recurring ethyleneoxy chains: about 23) (70:10:20)

PA-6) Copolymer of butyl acrylate/macromonomer having a poly(2,3-dihydroxypropyl acrylate) moiety (80:20)

PA-7) Copolymer of butyl acrylate/isobutyl acrylate/methacrylic acid ester of polyethylene glycol monomethyl ether (the number of recurring ethyleneoxy chains: about 9) (50:20:30)

PA-8) Copolymer of butyl acrylate/macromonomer having a poly(vinyl alcohol) moiety (80:20)

PA-9) Copolymer of butyl acrylate/macromonomer comprising acrylic acid as a constituent unit thereof (80:20)

PA-10) Copolymer of butyl acrylate/methacrylic acid ester of polyethylene glycol monomethyl ether (the number of recurring ethyleneoxy chains: about 23)/copolymer of methacrylic acid ester of polyethylene glycol monomethyl ether (the number of recurring ethyleneoxy chains: about 9) (70:20:10)

PA-11) Copolymer of butyl acrylate/1H, 1H,2H,2H-perfluorohexyl acrylate/methacrylic acid ester of polyethylene glycol monomethyl ether(the number of recurring ethyleneoxy chains: about 23) (70:10:20)

PA-12) Copolymer of butyl acrylate/macromonomer having a poly(dimethylsiloxane) moiety/polyethylene glycol monomethyl ether (the number of recurring ethyleneoxy chains: about 23) (75:5:20)

—Oil-soluble Dye—

The oil-soluble dye used in the colored fine particle dispersion of the invention is a dye which is substantially insoluble in water. More specifically, the oil-soluble dye is a dye the solubility of which in water (i.e., the mass of the dye that can be dissolved in 100 g of water) at 25° C. is 1 g or less, preferably 0.5 g or less, more preferably 0.1 g or less. Accordingly, the oil-soluble dye is the so-called oil-soluble dye, which is insoluble in water.

The melting point of the oil-soluble dye is preferably 200° C. or less, more preferably 150° C. or less, even more preferably 100° C. or less. The use of the oil-soluble dye having a low melting point causes suppression in crystal precipitation of the dye in the ink composition, so as to make the storage stability of the ink composition good.

In the colored fine particle dispersion of the invention, the oil-soluble dyes may be used alone or in a mixture form of two or more thereof. If necessary, the colored fine particle dispersion may comprise different colorants such as a water-soluble dye, a disperse dye, and a pigment as far as the advantageous effects of the invention are not hindered.

As the oil-soluble dyes, known compounds (dyes) can be used. Specific examples thereof include dyes described in JP-A No. 2002-114930, paragraphs [0023] to [0053].

In order to improve the resistance of the oil-soluble dayes against color-fading, in particular, the resistance against oxidizing materials such as ozone, or the hardening property of the colored fine particle dispersion, it is desirable that the oxidation potential of the oil-soluble dye is high. The oxidation potential of the oil-soluble dye is desirably higher (or nobler) than 1.0 V (vs SCE), more desirably higher than 1.1 V (vs SCE), even more desirably higher than 1.2 V (vs SCE), and even more desirably than 1.3 V (vs SCE).

Oxidation potential is described in JP-A No. 2002-309118, paragraphs [0049] to [0051].

The yellow dye which is the oil-soluble dye is preferably an oil-soluble dye represented by the following general formula (Y-1):

A-N=N—B　　　　　　　　　　　　　　　General Formula(Y-1)

The oil-soluble dye represented by the general formula (Y-1) may be used in not only yellow ink but also ink having any color, such as black ink, green ink or red ink.

In the general formula (Y-1), A and B each independently represents a heterocyclic group which may have a substituent. The heterocycle is preferably a heterocycle made of a 5-membered ring or 6-membered ring, may have a monocyclic structure or a polycyclic structure wherein two or more cycles are condensed, and may be an aromatic heterocycle or a non-aromatic heterocycle. The hetero atoms which constitute the heterocycle are preferably nitrogen, oxygen and sulfur atoms.

Preferable examples of the heterocycle represented by A include 5-pyrazolone, pyrazole, oxazolone, isooxazolone, barbituric acid, pyridone, rhodanine, pyrazolidinedione, pyrazolopyridone, meldrum's acid, and condensed heterocycles wherein a hydrocarbon aromatic cycle or a heterocycle is ring-condensed to these heterocycles. Of these examples, particularly preferable are 5-pyrazolone, 5-aminopyrazole, pyridone, and pyrazoloazoles. Even more preferable are 5-aminopyrazole, 2-hydroxy-6-pyridone and pyrazolotriazole.

Preferable examples of the heterocycle represented by B include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzoimidazole, triazole, oxazole, isooxazole, benzooxazole, thiazole, benzothiazole, isothiazole, benzoisothiazole, thiadiazole, benzoisooxazole, pyrrolidine, piperidine, piperadine, imidazolidine, and thiazoline. Of these examples, more preferable are pyridine, quinoline, thiophene, benzothiophene, pyrazole, imidazole, benzoimidazole, triazole, oxazole, isooxazole, benzooxazole, thiazole, benzothiazole, isothiazole, benzoisothiazole, thiadiazole, and benzoisooxazole. Even more preferable are quinoline, thiophene, pyrazole, thiazole, benzooxazole, benzoisooxazole, isothiazole, imidazole, benzothiazole and thiadiazole. Even more preferable are pyrazole, benzothiazole, benzooxazole, imidazole, 1,2,4-thiadiazole, and 1,3,4-thiadiazole.

Examples of the substituent which the A and the B may have include halogen atoms, and alky, cycloalkyl, aralkyl, alkenyl, alkynyl, aryl, heterocyclic, cyano, hydroxyl, nitro, alkoxy, aryloxy, silyloxy, heterocyclic oxy, acyloxy, carbamoyloxy, alkoxycarbonyloxy, aryloxycarbonyloxy, amino, acylamino, aminocarbonylamino, alkoxycarbonylamino, aryloxycarbonylamino, sulfamoylamino, alkyl and arylsulfonylamino, mercapto, alkylthio, arylthio, heterocyclic thio, sulfamoyl, alkyl and arylsulfinyl, alkyl and arylsulfonyl, acyl, aryloxycarbonyl, alkoxycarbonyl, carbamoyl, imide, phosphino, phosphinyl, phosphinyloxy, phosphinylamino and silyl groups.

Of the dyes represented by the general formula (Y-1), dyes represented by the following general formulae (Y-II), (Y-III), and (Y-IV) are more preferable:

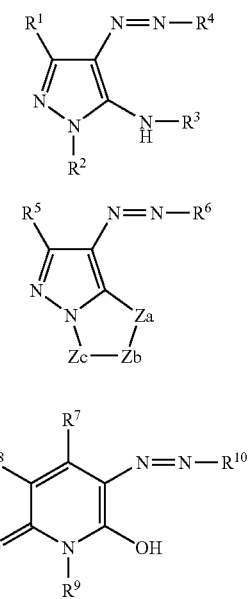

General formula (Y-II)

General formula (Y-III)

General formula (Y-IV)

In the general formula (Y-II), $R^1$ and $R^3$ each independently represents a hydrogen atom, or a cyano, alkyl, cycloalkyl, aralkyl, alkoxy, alkylthio, arylthio, aryl or ionic hydrophilic group. $R^2$ represents a hydrogen atom, or an alkyl, cycloalkyl, aralkyl, carbamoyl, acyl, aryl or heterocyclic group. $R^4$ represents a heterocycle.

In the general formula (Y-III), $R^5$ represents a hydrogen atom, or a cyano, alkyl, cycloalkyl, aralkyl, alkoxy, alkylthio, arylthio, aryl or ionic hydrophilic group. Za represents —N=, —NH— or C($R^{11}$)=, Zb and Zc each independently represents —N= or C($CR^{11}$)=, and $R^{11}$ represents a hydrogen atom or a nonmetallic substituent. $R^6$ represents a heterocyclic group.

In the general formula (Y-IV), $R^7$ and $R^9$ each independently represents a hydrogen atom, or a cyano, alkyl, cycloalkyl, aralkyl, aryl, alkylthio, arylthio, alkoxycarbonyl, carbamoyl, or ionic hydrophilic group. $R^8$ represents a hydrogen atom or a halogen atom, or an alkyl, alkoxy, aryl, aryloxy, cyano, acylamino, sulfonylamino, alkoxycarbonylamino, ureido, alkylthio, arylthio, alkoxycarbonyl, carbamoyl, sulfamoyl, sulfonyl, acyl, alkylamino, arylamino, hydroxy, or ionic hydrophilic group. $R^{10}$ represents a heterocyclic group.

The substituents represented by $R^1$, $R^2$, $R^3$, $R^5$, $R^7$, $R^8$ and $R^9$ in the general formulae (Y-II), (Y-III) and (Y-IV) are described in detail hereinafter.

The alkyl group represented by $R^1$, $R^2$, $R^3$, $R^5$, $R^7$, $R^8$ and $R^9$ may be a substituted alkyl group or an unsubstituted alkyl group.

Preferable examples of the alky group include alkyl groups having 1 to 20 carbon atoms, and examples of the substituent include hydroxyl, alkoxy, cyano and ionic hydrophilic groups, and halogen atoms.

Specifically, preferable examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl represented by $R^1$, $R^2$, $R^3$, $R^5$, $R^7$, $R^8$ and $R^9$ may be a substitued cycloalkyl group or an unsubstituted cycloalkyl group.

Preferable examples of the cycloalkyl group include cycloalkyl groups having 5 to 12 carbon atoms. An example of the substituent is an ionic hydrophilic group.

Specifically, a preferable example of the cycloalkyl group is cyclohexyl.

The aralkyl group represented by $R^1$, $R^2$, $R^3$, $R^5$, $R^7$, $R^8$ and $R^9$ may be a substituted aralkyl group or an unsubstituted aralkyl group.

Preferable examples of the aralkyl group include aralkyl groups having 7 to 20 carbon atoms. An example of the substituent is an ionic hydrophilic group.

Specifically, preferable examples of the aralkyl group include benzyl and 2-phenethyl groups.

The aryl group represented by $R^1$, $R^2$, $R^3$, $R^5$, $R^7$ and $R^9$ may be a substituted aryl group or an unsubstituted aryl group.

Preferable examples of the aryl group include aryl groups having 6 to 20 carbon atoms. Examples of the substituent include alkyl, alkoxy, alkylamino and ionic hydrophilic groups, and halogen atoms.

Specifically, preferable examples of the aryl group include phenyl, p-tolyl, p-methoxyphenyl, o-chlorophenyl and m-(3-sulfopropylamino)phenyl.

The alkylthio group represented by $R^1$, $R^2$, $R^3$, $R^5$, $R^7$, $R^8$ and $R^9$ may be a substituted alkylthio group or an unsubstituted alkylthio group.

Preferable examples of the alkylthio group include alkylthio groups having 1 to 20 carbon atoms. An example of the substituent is an ionic hydrophilic group.

Specifically, preferable examples of the alkylthio group include a methylthio group and an ethylthio group.

The arylthio group represented by $R^1$, $R^2$, $R^3$, $R^5$, $R^7$, $R^8$ and $R^9$ may be a substituted arylthio group or an unsubstituted arylthio group.

Preferable examples of the arylthio group include arylthio groups having 6 to 20 carbon atoms. Examples of the substituent include alkyl and ionic hydrophilic groups.

Specifically, preferable examples of the arylthio group include a phenylthio group and p-tolylthio group.

The heterocyclic group represented by $R^2$ is preferably a 5-membered or 6-membered heterocycle, and such heterocycles may be further ring-condensed. The hetero atoms which constitute the heterocycle are preferably a nitrogen atom, a sulfur atom and an oxygen atom. The heterocycle may be an aromatic heterocycle or a non-aromatic heterocycle. The heterocycle may further have a substituent. Preferable examples of the substituent are the same as described as the examples of the substituent of the aryl group. Preferable examples of the heterocycle include 6-membered nitrogen-containing aromatic heterocycles, and particularly preferable examples thereof include triazine, pyrimidine and phthalazine.

The halogen atom represented by $R^8$ is preferably a fluorine atom, a chlorine atom or a bromine atom.

The alkoxy group represented by $R^1$, $R^3$, $R^5$ and $R^8$ may a substituted alkoxy group or an unsubstituted alkoxy group.

Examples of the alkoxyl group include alkoxy groups having 1 to 20 carbon atoms. Examples of the substituent include a hydroxyl group and an ionic hydrophilic group.

Specifically, preferable examples of the alkoxy group include a methoxy group, an ethoxy group, an isopropoxy group, a methoxyethoxy group, a hydroxyethoxy group, and a 3-carboxypropoxy group.

The aryloxy group represented by $R^8$ may be a substituted aryloxy group or an unsubstituted aryloxy group.

Preferable examples of the aryloxy group include aryloxy groups having 6 to 20 carbon atoms. Examples of the substituent include an alkoxy group and an ionic hydrophilic group.

Specifically, examples of the aryloxy group include a phenoxy group, a p-methoxyphenoxy group and an o-methoxyphenoxy group.

The acylamino group represented by $R^8$ may be a substituted acylamino group or an unsubstituted acylamino group.

Preferable examples of the acylamino group include acylamino groups having 2 to 20 carbon atoms. An example of the substituent is an ionic hydrophilic group.

Specifically, preferable examples of the acylamino group include acetoamide, propionamide, benzamide, and 3,5-disulfobenzamide.

The sulfonylamino group represented by $R^8$ may be a substituted sulfonylamino group or an unsubstituted sulfonylamino group.

Preferable examples of the sulfonylamino group include sulfonylamino groups having 1 to 20 carbon atoms.

Specifically, preferable examples of the sulfonylamino group include a methylsulfonylamino group, and a ethylsulfonylamino group.

The alkoxycarbonylamino group represented by $R^8$ may be a alkoxycarbonylamino group or an unsubstituted alkoxycarbonylamino group.

Preferable examples of the alkoxycarbonylamino group include alkoxycarbonylamino groups having 2 to 20 carbon atoms. An example of the substituent is an ionic hydrophilic group.

Specifically, preferable examples of the alkoxycarbonylamino group include an ethoxycarbonylamino group.

The ureido group represented by $R^8$ may be a substituted ureido group or an unsubstituted ureido group.

Preferable examples of the ureido group include ureido groups having 1 to 20 carbon atoms. Examples of the substituent include an alkyl group and an aryl group.

Specifically, preferable examples of the ureido group include 3-methylureido, 3,3-dimethylureido and 3-phenylureido.

The alkoxycarbonyl group represented by $R^7$, $R^8$ and $R^9$ may be a alkoxycarbonyl group or an unsubstituted alkoxycarbonyl group.

Preferable examples of the alkoxycarbonyl group include alkoxycarbonyl groups having 2 to 20 carbon atoms.

An example of the substituent is an ionic hydrophilic group.

Specifically, preferable examples of the alkoxycarbonyl group include a methoxycarbonyl group and an ethoxycarbonyl group.

The carbamoyl group represented by $R^2$, $R^7$, $R^8$ and $R^9$ may be a substituted carbamoyl group or an unsubstituted carbamoyl group. Examples of the substituent include an alkyl group.

Specifically, preferable examples of the carbamoyl group include methylcarbamoyl group and dimethylcarbamoyl group.

The sulfamoyl group represented by $R^8$ may be a substituted sulfamoyl group or an unsubstituted sulfamoyl group. Examples of the substituent include an alkyl group.

Specifically, preferable examples of the sulfamoyl group include dimethylsulfamoyl group and di-(2-hydroxyethyl) sulfamoyl group.

Preferable examples of the sulfonyl group represented by $R^8$ include methanesulfonyl group and phenylsulfaonyl group.

The acyl group represented by $R^2$ and $R^8$ may a substituted acyl group or an unsubstituted acyl group. Preferable examples of the acyl group include acyl groups having 1 to 20 carbon atoms. An example of the substituent is an ionic hydrophilic group.

Specifically, preferable examples of the acyl group include an acetyl group and benzoyl group.

The amino group represented by $R^8$ may a substituted amino group or an unsubstituted amino group. Examples of the substituent include an alkyl group, an aryl group and a heterocyclic group.

Specifically, preferable examples of the amino group include methylamino, diethylamino, anilino and 2-chloroanilino groups.

The heterocycle represented by $R^4$, $R^6$ and $R^{10}$ are equivalent to the heterocycle, which may have a substituent, represented by the B in the general formula (Y-1). Preferable examples, more preferable examples and even more examples thereof are the same as described above.

Examples of the substituent include an ionic hydrophilic group, an alkyl group having 1 to 12 carbon atoms, an aryl group, an alkyl- or aryl-thio group, a halogen atom, a cyano group, sulfamoyl group, sulfonamino group, carbamoyl group, and acylamino group. The alkyl and aryl groups may further have a substituent.

In the general formula (Y-III), Za represents —N═, —NH— or $C(R^{11})$═, Zb and Zc each independently represent —N═ or $C(R^{11})$═, and $R^{11}$ represents a hydrogen atom or a nonmetallic substituent. Preferable examples of the nonmetallic substituent represented by $R^{11}$ include a cyano group, a cycloalkyl group, an aralkyl group, an aryl group, an alkylthio group, an arylthio group, and an ionic hydrophilic group. Each of the substituents has the same meanings as each of the substituents represented by $R^1$ has. Preferable examples thereof are also the same. Examples of the skeleton of a heterocycle made of two 5-membered rings, which can be represented by the general formula (Y-III), are illustrated below.

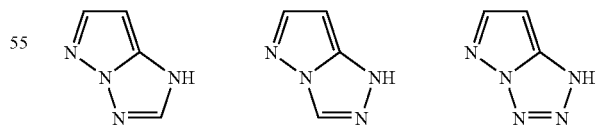

In the case that each of the above substituents may further have a substituent, examples of the substituent include the same substituents as the heterocycles A and B in the general formula (Y-I) may have.

The following illustrates specific examples (Y-101 to Y-160) of the dye represented by the general formula (Y-1). In the invention, the dye is not limited to the specific examples. These compounds can be synthesized with reference to JP-A Nos. 2-24191 and 2001-279145.

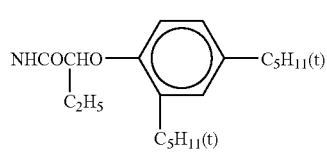

| Dye | R |
|---|---|
| Y-101 | CON(C$_2$H$_5$)$_2$ |
| Y-102 | CON(C$_4$H$_9$)$_2$ |
| Y-103 | CON(C$_6$H$_{13}$)$_2$ |
| Y-104 | COOC$_4$H$_9$ |
| Y-105 | COOC$_6$H$_{13}$ |
| Y-106 | COC$_4$H$_9$ |
| Y-107 | CONHC$_4$H$_9$ |
| Y-108 | CONHC$_6$H$_{13}$ | new get,632

| Dye | R |
|---|---|
| Y-109 | COOC$_4$H$_9$ |
| Y-110 | CONHC$_4$H$_9$ |
| Y-111 | CON(C$_4$H$_9$)$_2$ |
| Y-112 | SO$_2$NHC$_6$H$_{13}$ |
| Y-113 | SO$_2$N(C$_4$H$_9$)$_2$ |
| Y-114 | NHCOC$_6$H$_{13}$ |
| Y-115 | NHSO$_2$C$_8$H$_{17}$ |
| Y-116 | C$_4$H$_9$ |
| Y-117 | OC$_6$H$_{13}$ |
| Y-118 | COOC$_{12}$H$_{25}$ |
| Y-119 | 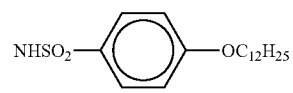 |
| Y-120 | 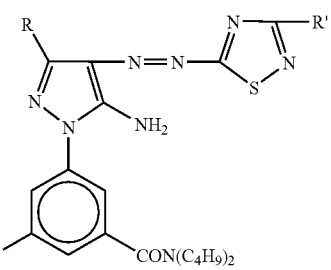 |

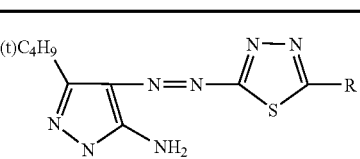

| Dye | R | R' |
|---|---|---|
| Y-121 | CH$_3$ | H |
| Y-122 | Ph | H |
| Y-123 | OC$_2$H$_5$ | H |
| Y-124 | C$_4$H$_9$(t) | SCH$_3$ |
| Y-125 | C$_4$H$_9$(t) | Ph |
| Y-126 | C$_4$H$_9$(t) | CH$_3$ |
| Y-127 | C$_4$H$_9$(t) | SC$_8$H$_{17}$ |

-continued

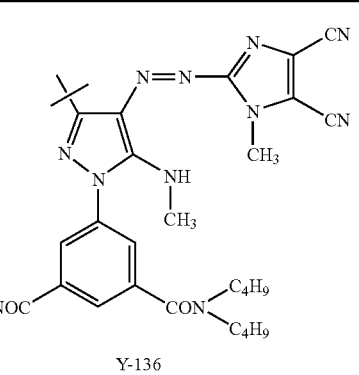

| Dye | R |
|---|---|
| Y-128 | CH$_2$Ph |
| Y-129 | C$_4$H$_9$ |
| Y-130 | C$_8$H$_{17}$ |
| Y-131 | CONH$_2$ |

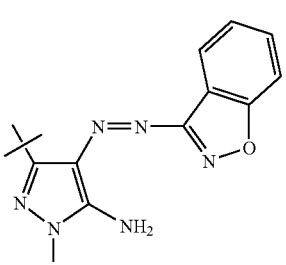

| Dye | R |
|---|---|
| Y-132 | H |
| Y-133 | CH$_3$ |
| Y-134 | Ph |
| Y-135 | SCH$_3$ |

Y-136

Y-137

-continued
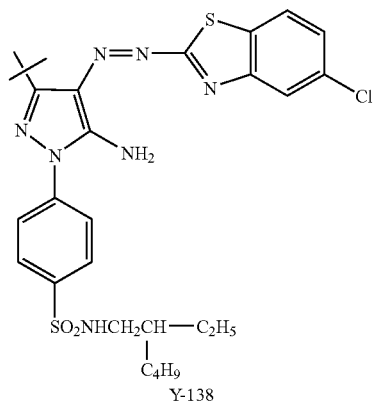
Y-138
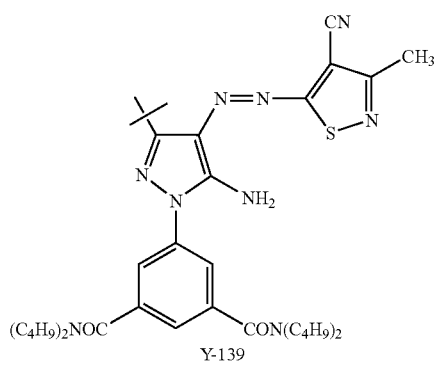
Y-139
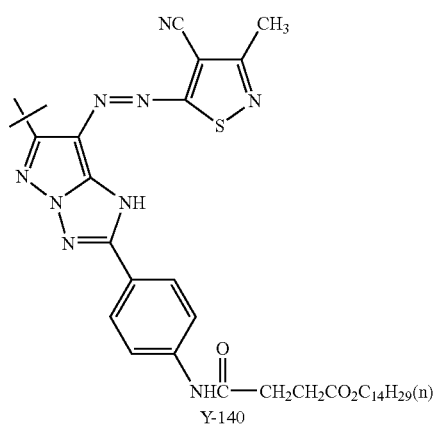
Y-140
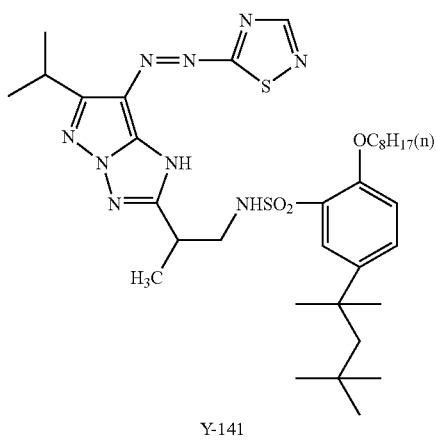
Y-141
-continued
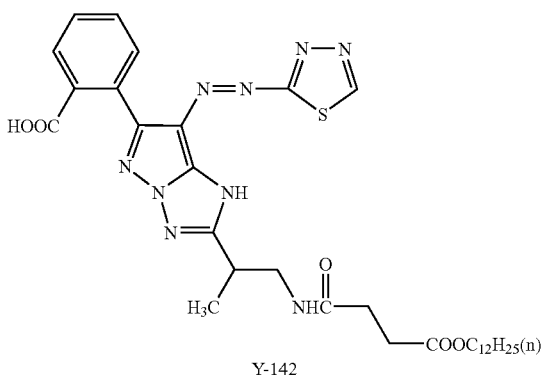
Y-142
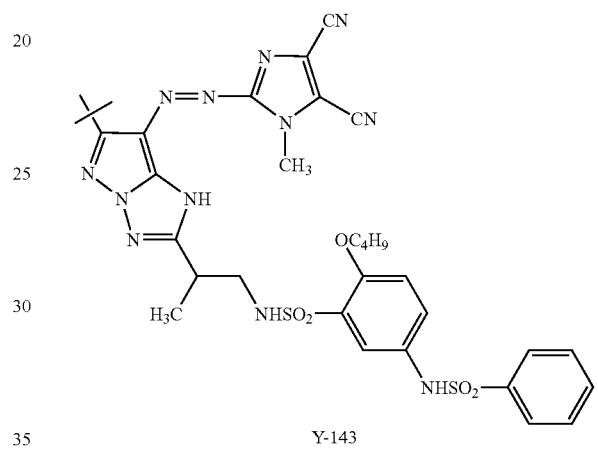
Y-143
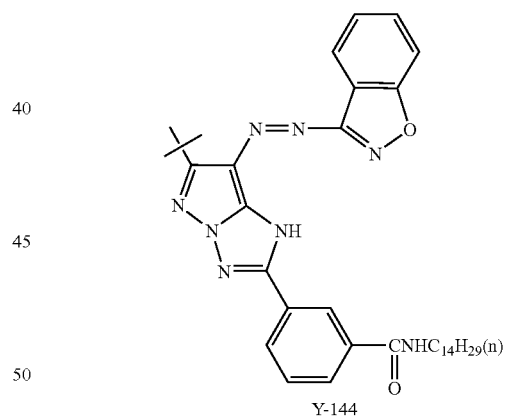
Y-144
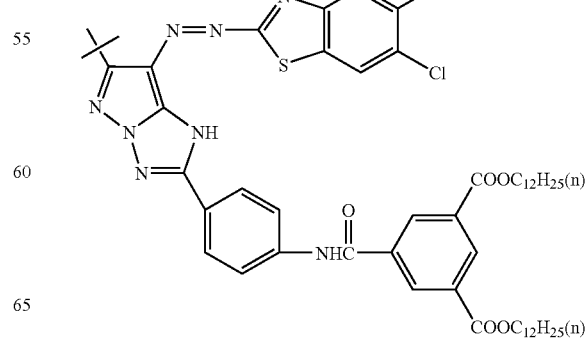

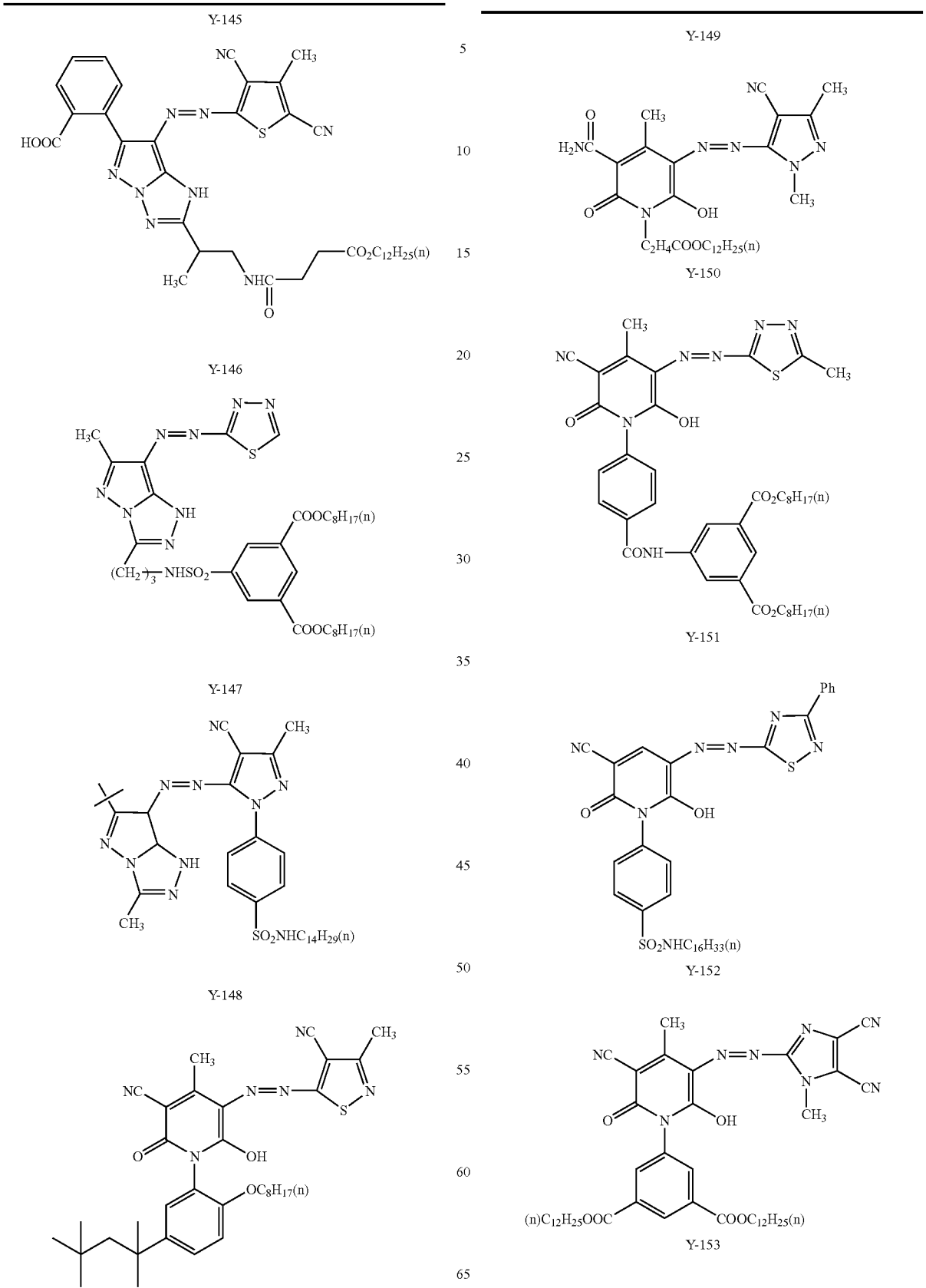

-continued

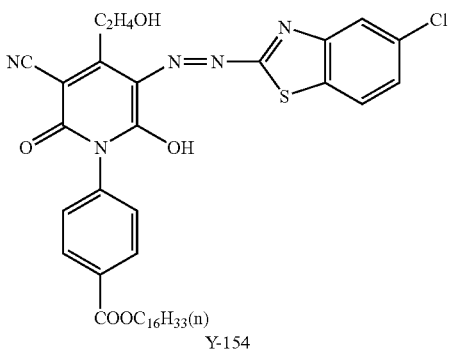
Y-154

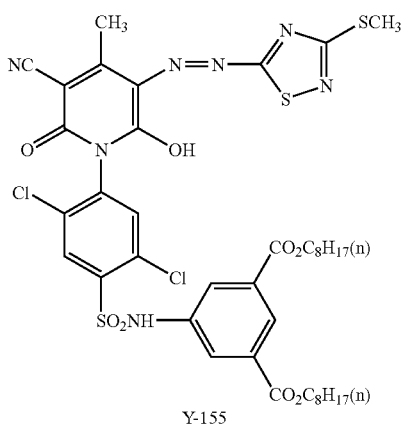
Y-155

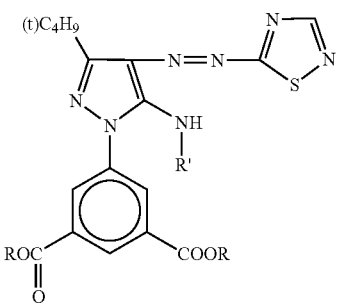

| Dye | R | R' |
|---|---|---|
| Y-156 | —C$_{16}$H$_{33}$ | C$_4$H$_9$ |
| Y-157 | —C$_{16}$H$_{33}$ | C$_2$H$_5$ |
| Y-158 | —C$_{14}$H$_{29}$ | H |
| Y-159 | —C$_{18}$H$_{37}$ | H |
| Y-160 | —CH$_2$CH(C$_2$H$_5$)—C$_4$H$_9$ | CH$_3$ |

A preferable structure of the magenta dye that is the oil-soluble dye is represented by the general formula (3) or (4) in JP-A No. 2002-114930, and specific examples of the dye include compounds described in JP-A No. 2002-114930, paragraphs [0054] to [0073].

Particularly preferable examples thereof are azo dyes represented by the general formulae (M-1) to (M-2) described in JP-A No. 2002-121414, paragraphs [0084] to [0122]. Specific examples thereof include compounds described in JP-A No. 2002-121414, paragraphs [0123] to [0132]. The oil-soluble dyes represented by general formulae (3), (4) and (M-1) to (M-2) may be used in not only magenta ink but also ink having any color, such as black ink, or red ink.

Preferable examples of the cyan dye that is the oil-soluble dye include dyes represented by the formulae (I) to (IV) in JP-A No. 2001-181547, and dyes represented by the general formulae (IV-1) to (IV-4) described in JP-A No. 2002-121414, paragraphs [0063] to [0078]. Specific examples thereof include compounds described in JP-A No. 2001-181547, paragraphs [0052] to [0066], and JP-A No. 2002-121414, paragraphs [0079] to [0081].

Particularly preferable examples of the cyan dye include phthalocyanine dyes represented by the general formulae (C-I) and (C-II) described in JP-A No. 2002-121414, paragraphs [0133] to [0196]. The phthalocyanine dyes represented by the general formula (C-II) are even more preferable. Specific examples thereof include compounds described JP-A No. 2002-121414, paragraphs [0198] to [0201]. The oil-soluble dyes represented by the formulae (I) to (IV), (IV-1) to (IV-4) and (C-I) to (C-II) may be used in not only cyan ink but also ink having any color, such as black ink, or green ink.

It is essential that the oil-soluble dye is present in the state that the dye is dissolved in the colored fine particles. It is also important that the crystal thereof is not precipitated with the passage of time. In other words, it is important that the dye has a high compatibility with the dispersible polymer (in particular, with the hydrophobic moiety thereof).

It is generally said that the solubility parameter (hereinafter referred to as an SP value) of the dispersible polymer is closer to the SP value of the oil-soluble dye. However, the compatibility depends on the structure of the dissolved molecule (the oil-soluble dye in the invention) and that of the solvent (the dispersible polymer in the invention); therefore, the compatibility may not be judged by the SP values. It has been found out that in the case of the oil-soluble dye of the invention, appropriate selection of two physical properties of a molecular volume V value and the SP value thereof makes it possible to exhibit satisfactory solubility and storage stability with the passage of time.

The SP value of the oil-soluble dye is preferably from 26 to 21, more preferably from 25 to 21, even more preferably from 24 to 21, and even more preferably from 24 to 22. The V value of the oil-soluble dye is preferably from 810 to 270, more preferably from 800 to 300, even more preferably from 750 to 350, and even more preferably from 700 to 380.

The V value (cm$^3$/mol) and the SP value (J$^{0.5}$/cm$^{1.5}$) are values calculated according to the Fedors method. The method for the calculation is described in Polym. Eng. Sci. Vol. 14, p. 147, (1974).

The content of the oil-soluble dye in ink is preferably from 0.05 to 15% by mass, more preferably from 0.1 to 10% by mass, and even more preferably from 0.2 to 6% by mass.

—Production of the Colored Fine Particle Dispersion—

The colored fine particle dispersion of the invention can be produced by dispersing the dispersible polymer and the oil-soluble dye, in the form of colored fine particles, into an aqueous medium (i.e., a liquid containing at least water). Specific examples thereof include a method of preparing a latex of the dispersible polymer beforehand and impregnating the latex with the oil-soluble dye, and a co-emulsification dispersing method.

Of these methods, the co-emulsification dispersing method is preferable. A preferable example of the co-emulsification dispersing method is a method of adding water to an organic solvent containing the dispersible polymer and the oil-soluble dye or adding the same organic solvent to water, thereby emulsifying the organic solvent into the form of fine particles.

The latex is a substance wherein the dispersible polymer, which is insoluble in the aqueous solvent, is dispersed as fine particles in the aqueous medium. The state that the polymer is dispersed may be any one selected from the following: the state that the dispersible polymer is emulsified in the aqueous medium; the state that the polymer is emulsion-polymerized; the state that the polymer is micelle-dispersed; and the state that the molecular chains themselves of the dispersible polymer which partially has a hydrophilic structure in the molecule thereof are dispersed into a molecular form.

The method of preparing the polymer latex beforehand and impregnating the latex with the oil-soluble dye will be described hereinafter.

A first example of this method comprises a first step of preparing the polymer latex, a second step of preparing colorant-containing liquid wherein the oil-soluble dye is dispersed or dissolved in an organic solvent, and a third step of mixing the colorant-containing liquid with the polymer latex to prepare a colored fine particle dispersion.

A second example of this method comprises a first step of preparing the polymer latex, a second step of preparing a colorant-containing liquid wherein the oil-soluble dye is dispersed or dissolved in an organic solvent, and then mixing this colorant-containing liquid with a liquid containing at least water to prepare a colored fine particle dispersed liquid, and a third step of mixing the polymer latex with the colored fine particle dispersed liquid to prepare a colored fine particle dispersion.

A third example of this method is the method described in JP-A No. 55-139471.

Next, the co-emulsification dispersing method will be described.

A first example of this method comprises a first step of preparing a polymer-colorant mixed liquid wherein the oil-soluble dye and the dispersible polymer are dispersed or dissolved in an organic solvent, and a second step of mixing the polymer-colorant mixed liquid with a liquid containing at least water to prepare a colored fine particle dispersion.

A second example of this method comprises a first step of preparing a colorant-containing liquid wherein the oil-soluble dye is dispersed or dissolved in an organic solvent, a second step of preparing a polymer solution wherein the dispersible polymer is dispersed or dissolved in an organic solvent, and a third step of mixing the colorant-containing liquid, the polymer solution, and a liquid containing at least water to prepare a colored fine particle dispersion.

A third example of this method comprises a first step of preparing a colorant-containing liquid wherein the oil-soluble dye is dispersed or dissolved in an organic solvent and then mixing this colorant-containing liquid with a liquid containing at least water to prepare a colorant fine particle dispersed liquid, a second step of preparing a polymer solution wherein the dispersible polymer is dispersed or dissolved in an organic solvent and then mixing this polymer solution with a liquid containing at least water to prepare a polymer fine particle dispersed liquid, and a third step of mixing the colorant fine particle dispersed liquid with the polymer fine particle dispersed liquid to prepare a colored fine particle dispersion.

A fourth example of this method comprises a first step of preparing a colorant-containing liquid wherein the oil-soluble dye is dispersed or dissolved in an organic solvent and then mixing this colorant-containing liquid with a liquid containing at least water to prepare a colorant fine particle dispersed liquid, a second step of preparing a polymer solution wherein the dispersible polymer is dispersed or dissolved in an organic solvent, and a third step of mixing the colorant fine particle dispersed liquid with the polymer solution to prepare a colored fine particle dispersion.

A fifth example of this method comprises the step of mixing a liquid containing at least water with the oil-soluble dye and the dispersible polymer to prepare a colored fine particle dispersion directly.

Regarding the amount of the dispersible polymer used in the colored fine particle dispersion, the amount of the dispersible polymer is preferably from 10 to 1,000 parts by mass, more preferably from 50 to 600 parts by mass per 100 parts by mass of the oil-soluble dye. If the amount of the used dispersible polymer is less than 10 parts by mass, it may be difficult that the fine particles are finely and stably dispersed. If the amount is more than 1,000 parts by mass, the ratio of the oil-soluble dye in the colored fine particle dispersion becomes small. As a result, in the case that the colored fine particle dispersion is used as an aqueous ink, the freedom of the formulation design of the composition of the ink may be limited.

The content by percentage of the colored fine particles in the colored fine particle dispersion is preferably from 1 to 45% by mass, more preferably from 2 to 30% by mass. This content can be appropriately adjusted by dilution, evaporation, ultrafiltration or the like.

The volume-average particle size of the colored fine particles is preferably from 1 to 500 nm, more preferably from 3 to 300 nm, and even more preferably from 3 to 200 nm. The particle size distribution thereof is not particularly limited, and may be a broad particle size distribution or a monodispersed particle size distribution. The particle size and the particle size distribution can be adjusted by centrifugation, filtration or some other operation.

—Organic Solvent—

The organic solvent used when the colored fine particle dispersion is produced is not particularly limited, and can be appropriately selected on the basis of the solubility of the oil-soluble dye or the dispersible polymer. Examples of the organic solvent include ketone solvents such as acetone, methyl ethyl ketone, and diethyl ketone; alcohol solvents such as methanol, ethanol, 2-propanol, 1-propanol, 1-butanol, and tert-butanol; chlorine-containing solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycol ether solvents such as ethylene glycol monomethyl ether, and ethylene glycol dimethyl ether.

The organic solvents may be used alone or in combination of two or more thereof. A mixed solvent composed of the organic solvent and water may be used in accordance with the solubility of the dye or the polymer.

The amount of the used organic solvent is not particularly limited as far as the advantageous effects of the invention are not damaged. The amount is preferably from 10 to 2000 parts by mass, more preferably from 100 to 1000 parts by mass per 100 parts by mass of the dispersible polymer.

If the amount of the used organic solvent is less than 10 parts by mass, it may be difficult that the colored fine particles are finely and stably dispersed. If the amount is more than 2000 parts by mass, solvent-removing and solvent-concentrating steps for removing the organic solvent become essential. Thus, the process for producing the colored fine particle dispersion gets complicated, and further the freedom of the formulation design of the composition of the dispersion may be limited.

In the case that the vapor pressure of the organic solvent is larger than that of water, it is preferable from the viewpoints of the stability of the colored fine particle dispersion, safety, and hygiene that the organic solvent is removed. The method for removing the organic solvent may be selected from known various methods (such as evaporation, vacuum evaporation, and ultrafiltration), depending on the kind of the solvent. Preferably, the step for removing the organic solvent is performed as promptly as possible immediately after the emulsification.

—Additives—

The colored fine particle dispersion of the invention may comprise additives selected appropriately in accordance with purposes as long as the advantage of the invention is not adversely effected.

Examples of the additives include a neutralizing agent, a hydrophobic high-boiling-point organic solvent, a dispersing agent, and a dispersion stabilizer.

In the case that the dispersible polymer has a non-neutralized dissociating group, the neutralizing agent can be advantageously used in order to contrl the pH value of the colored fine particle dispersion and the self-emulsifying ability thereof, and impart dispersion stability thereto.

Examples of the neutralizing agent include an organic base and an inorganic alkali.

Examples of the organic base include triethanolamine, diethanolamine, N-methyldiethanolamine, and dimethylethanolamine.

Examples of the inorganic alkali include hydroxides of alkali metals (such as sodium hydroxide, lithium hydroxide, and potassium hydroxide), carbonates thereof (such as sodium carbonate, and sodium hydrogencarbonate), and ammonia.

The neutralizing agent is added so as to make the pH value of the colored fine particle dispersion preferably to 4.5 to 10.0, more preferably to 6.0 to 10.0, in order to improve the dispersion stability of the colored fine particle dispersion.

The hydrophobic high-boiling-point organic solvent is used to adjust the viscosity, the specific gravity, the printing performance and other performances of the colored fine particle dispersion. The hydrophobic high-boiling-point organic solvent is hydrophobic, and the boiling point of the hydrophobic solvent is preferably 150° C. or more, more preferably 170° C. or more. The word "hydrophobic" means a solubility of 3% or less in distilled water at 25° C. The dielectric constant of the hydrophobic high-boiling-point organic solvent is preferably from 3 to 12, more preferably from 4 to 10. The dielectric constant used herein means the dielectric constant relative to the dielectric constant of vacuum at 25° C. As the hydrophobic high-boiling-point organic solvent, compounds described in U.S. Pat. No. 2,322,027 and Japanese Patent Application No. 2000-78531 can be used. Specific examples thereof include phosphoric acid triesters, phthalic acid diesters, alkylnaphthalenes and benzoic acid esters. These may be used in the form of liquid or solid at ambient temperature in accordance with purpose.

The amount of the used high-boiling-point organic solvent is not particularly limited as long as the advantage of the invention is not adversely effected. The amount of the solvent is preferably from 0 to 1,000 parts by mass, more preferably from 0 to 300 parts by mass per 100 parts by mass of the dispersible polymer.

The dispersing agent and/or the dispersion stabilizer may be added to any one of the polymer latex, the colorant-containing liquid, the polymer-colorant mixed liquid, the colorant fine particle dispersed liquid, the polymer solution, the liquid containing at least water, and others. It is preferable to add the dispersing agent and/or the dispersion stabilizer to the colorant-containing liquid or the liquid containing water in the step before the preparation of the polymer latex and/or the colorant fine particle dispersed liquid.

Examples of the dispersing agent and the dispersing stabilizer include various cationic, anionic and nonionic surfactants, and water-soluble or water-dispersible low-molecular compounds and oligomers. The amount of the dispersing agent or the dispersion stabilizer added is from 0 to 100% by mass, preferably from 0 to 20% by mass relative to the total of the oil-soluble dye and dispersible polymer.

—Use of the Colored Fine Particle Dispersion—

The colored fine particle dispersion of the invention can be used in various fields, and is suitable for aqueous ink for writing, aqueous ink for printing, and ink for information-recording, particularly for the ink of the invention, which is described below.

In the case that the colored fine particle dispersion is used as an ink such as aqueous ink for writing, aqueous ink for printing or ink for information-recording, a recording material for the ink is not particularly limited and may be made of known materials. Examples thereof include plain paper, resin-coated paper, paper for ink-jet printing, films, paper which can also be used for electrophotography, cloth, glass, metals, and ceramics.

(Ink)

The ink of the invention comprises the colored fine particle dispersion of the invention and may further comprise other additives selected appropriately as the need arises. Examples of the other additives include known additives such as a drying preventive, a permeation promoter, an antioxidant, an antifungal agent, a pH adjustor, a surface tension adjustor, an antifoaming agent, a viscosity adjustor, a dispersing agent, a dispersion stabilizer, a rust inhibitor, and a chelating agent. As these additives, additives described in JP-A No. 2001-279141, paragraphs [0217] to [0226] can be used.

As the ink of the invention, an ink described in JP-A No. 2001-279141, paragraph [0247] can be used.

—Other Additives—

As the additives, one or more selected from the following can be used in an appropriate amount or appropriate amounts: an water-soluble organic solvent, a surface tension adjustor, a viscosity adjustor, a dispersing agent, a dispersion stabilizer, an antioxidant, an antifungal agent, a rust inhibitor, a pH adjustor, an antifoaming agent, a chelating agent, an ultraviolet absorber, and others. As these additives, known compounds described in JP-A No. 2001-181549 and so on can be used.

The water-soluble organic solvent is used as a drying preventive or a permeation promoter. The water-soluble organic agent is preferably a water-soluble organic agent having a vapor pressure lower than that of water. Specific examples thereof include polyhydric alcohols, typical examples of which includes ethylene glycol, propylene glycol, diethylene glycol, polyethylene glycol, thiodiglycol, dithiodiglycol, 2-methyl-1,3-propanediol, 1,2,6-hexanetriol, glycerin, trimethylolpropane, and diethanolamine; substituted or unsubstituted aliphatic monohydric alcohols, typical examples of which include amyl alcohol, furfuryl alcohol, diacetone alcohol, ethylene glycol monoethyl ether, diethylene glycol monomethyl ether, and triethylene glycol monoethyl ether; heterocyclic compounds such as 2-pyrrolidone, N-methyl-2-pyrrolidone, 1,3-dimethyl-2-imidazolidinone, and N-ethylmorpholine; and sulfur-containing compounds such as sulfolane, dimethylsulfoxide, and 3-sulfolene.

Of these examples, polyhydric alcohols and substituted or unsubstituted aliphatic monohydric alcohols are preferable, and polyhydric alcohols such as glycerin and diethylene glycol are more preferable. The above-mentioned water-soluble organic solvents may be used alone or in combination of two or more thereof.

The content by percentage of the water-soluble organic solvent(s) in the ink is preferably from 5 to 60% by mass, more preferably from 7 to 50% by mass, and even more preferably from 10 to 40% by mass.

Examples of the surface tension adjustor include nonionic, cationic and anionic surfactants. Examples of the anionic surfactants include aliphatic acid salts, alkylsulfates, alkylarylsulfonates (such as alkylbenzenesulfonate, and petroleum sulfonate), dialkylsulfosuccinates, alkylphosphates, naphthalenesulfonic acid-formalin condensate, and polyoxyethylene alkylsulfonates. Examples of the nonionic surfactants include acetylenebased diols (such as 2,4,7,9-tetramethyl-5-decyne-4,7-diol), polyoxyethylene alkyl ether (such as polyoxyethylene decyl ether and ethylene oxide adducts of acetylene-based diol), polyoxyethylene aliphatic acid esters, sorbitan aliphatic acid esters, polyoxyethylene sorbitan aliphatic acid esters, polyoxyethylene alkylamines, glycerin aliphatic acid esters, and oxyethylene oxypropylene block copolymer.

Amine oxide type amphoteric surfactants such as N,N-dimethyl-N-alkylamine oxide are also preferable. Surfactants described in JP-A No. 59-157,636, pages 37-38, and Research Disclosure No. 308119 (1989) can also be used.

The following are preferable since precipitation or separation is not easily caused from ions thereof and the foaming ability thereof is small: anionic surfactants having a hydrophobic moiety of two chains or a branched hydrophobic moiety; anionic surfactants having, near the center of a hydrophobic moiety thereof, a hydrophilic group; nonionic surfactants having a hydrophobic moiety of two chains or a branched hydrophobic moiety (such as a single-end ester of polyethylene oxide esterified with 2-butyloctanoic acid, and a polyethylene oxide adduct of undecane-6-ol); and nonionic surfactants having, near the center of a hydrophobic moiety thereof, a hydrophilic group (such as ethylene oxide adducts of acetylene-based diol (for example, SURFYNOL series, manufactured by Air Products & Chemicals Co.)). Of these surfactants, surfactants having a molecular weight of 200 to 1,000 (inclusive) are preferable, surfactants having a molecular weight of 300 to 900 (inclusive) are more preferable, and surfactants having a molecular weight of 400 to 900 (inclusive) are even more preferable.

The surface tension of the ink of the invention is preferably from 20 to 60 mN/m, more preferably from 25 to 45 mN/m whether the surface tension adjustor is used or not. The dynamic surface tension of the ink is preferably from 20 to 40 mN/m, more preferably from 25 to 35 mN/m whether the surface tension adjustor is used or not.

The viscosity of the ink of the invention is adjusted to be preferably 30 mpa·s or less, more preferably 20 mpa·s or less. A viscosity adjustor for adjusting the viscosity may be used. Examples of the viscosity adjustor include water-soluble polymers such as celluloses and polyvinyl alcohol.

As the dispersing agent, the dispersion stabilizer, the antioxidant, the antifungal agent, the rust inhibitor, the pH adjustor, the antifoaming agent, the chelating agent, the ultraviolet absorber, known compounds described in JP-A No. 2001-181549 and so on can be used.

(Ink-jet Recording Method, and Recording Material)

The ink-jet recording method of the invention is a method of using the ink of the invention to record an image onto a recording material by ink-jet recording. After the image is formed by jetting and impinging the ink onto the recording material, the colored fine particles are subjected to heating treatment and/or pressing treatment, thereby fusing the colored fine particles so as to be adhered onto the recording material.

The recording material is preferably a recording sheet wherein an ink-receiving layer containing porous inorganic fine particles is formed on a support. In a preferable embodiment of the ink-jet recording method of the invention, the ink is jetted out and impinged onto this recording material to form an image, and subsequently the above-mentioned colored fine particles and porous resin layer are subjected to heating treatment and/or pressing treatment, thereby fusing the colored fine particles so as to be adhered onto the recording material.

No particular limitation is imposed on an ink-jet nozzle used when recording is performed by the ink-jet recording method of the invention. The nozzle can be appropriately selected in accordance with purpose.

—Recording Material—

Examples of the recording material used in the ink-jet recording method using the ink of the invention include a recording sheet wherein an ink-receiving layer containing porous inorganic fine particles is formed on a support, plain paper, coated paper, and plastic films. In the case that the above-mentioned recording sheet, wherein an ink-receiving layer containing porous inorganic fine particles is formed on a support, is used as the recording material, image quality is improved. Thus, this case is preferred. The recording material which can be used are described in JP-A No. 2001-181549 and JP-A No. 2001-279141, paragraphs [0228] to [0246]. The support which can be used may be a support that is made of a chemical pulp such as LBKP or NBKP, a mechanical pulp such as GP, PGW, RMP, TMP, CTMP, CMP or CGP, a wastepaper pulp such as DIP, or some other material, to which known additives such as a pigment, a binder, a sizing agent, a fixing agent, a cationizing agent, and a paper durability promoter are added if necessary. This support may be produced by means of any one of various machines such as a Fourdrinier machine and a cylinder paper machine. The thickness of the support is from about 10 to 250 μm. The weight thereof is preferably from 10 to 250 g/cm². As the support, the following may be used: a paper sheet both surfaces of which are laminated with a polyolefin (such as polyethylene, polystyrene, polyethylene terephthalate, polybutene or a copolymer thereof); or a plastic film.

The ink-receiving layer formed on the support contains a pigment and a binder. The pigment is preferably a white pigment, examples of which include: inorganic pigments such calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate; and organic pigments such as styrene type pigments, acrylic type pigments, urea resin, and melamine resin. Of these pigments, inorganic pigments in the form of fine particles are preferable, and inorganic pigments in the form of porous fine particles are more preferable. Synthetic amorphous silica having a large porous surface area is even more preferable. As the synthetic amorphous silica, any one of anhydrous silicate obtained by dry production process and hydrated silicate obtained by wet production process can be used.

Examples of the binder which can be used in the ink-receiving layer include polyvinyl alcohol, silanol-modified polyvinyl alcohol, starch, cationized starch, casein, gelatin, carboxymethylcellulose, hydroxyethylcellulose, polyvinyl pyrrolidone, polyalkylene oxide, and polyalkylene oxide derivatives.

EXAMPLES

Hereinafter, examples of the present invention are described. However, the invention is not limited to these examples. In the following description, the word "part(s)" and the symbol "%" represent "part(s) by mass" and "% by mass", respectively, unless otherwise specified.

Example 1

Preparation Example 1

Preparation of a Colored Fine Particle Dispersion (B-1))

To a mixed solution of 4 parts of tetrahydrofuran, 6 parts of tert-butanol, 1.5 parts of a dispersible polymer (PA-5) and 0.5 part of an oil-soluble dye (M-1 illustrated below) was gradually added 2-mol/L sodium hydroxide in such an amount that the acid of the dispersible polymer is neutralized. Thereafter, the temperature of the solution was raised to 70° C. Subsequently, 30 parts of water were gradually added to the solution while the solution was stirred to cause phase reversion emulsification. This emulsion was concentrated at 30° C. under reduced pressure to prepare a colored fine particle dispersion having a solid concentration of 16%. The volume-average particle size of the colored fine particles in the colored fine particle dispersion was 32 nm (according to measurement with Micro Track UPA150, manufactured by Nikkiso Co., Ltd.). This dispersion is referred to as the colored fine particle dispersion (B-1) hereinafter.

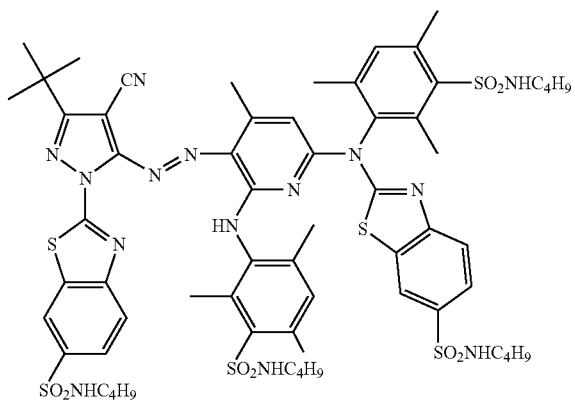

M-1

Preparation Example 2

Preparation of a Colored Fine Particle Dispersion (B-2))

Prepared was a mixed solution of 3 parts of ethyl acetate, 0.5 part of cyclohexanone, 1.4 parts of the dispersible polymer (PA-1), and 0.6 part of the oil-soluble dye (the above-illustrated M-1). Separately, prepared was a mixed solution of 15 parts of water, 0.2 part of petroleum sulfonate (trade name: Petronate HL, manufactured by Witoco Co.), and 0.4 part of an Emarl 20C (manufactured by Kao Corp.). The two mixed solutions were combined, mixed and emulsified with a homogenizer, and then the resultant emulsion was concentrated at 30° C. under reduced pressure to prepare a colored fine particle dispersion having a solid concentration of 16%. The volume-average particle size of the colored fine particles in the colored fine particle dispersion was 72 nm. This dispersion is referred to as the colored fine particle dispersion (B-2) hereinafter.

Preparation Example 3

Preparation of a Colored Fine Particle Dispersion (B-3))

Prepared was a mixed solution of 3 parts of ethyl acetate, 0.5 part of cyclohexanone, 0.8 part of the dispersible polymer (PA-1), 0.6 part of the oil-soluble dye (the above-illustrated M-1), 0.14 part of a hydrophobic high-boiling-point organic solvent (the above-illustrated S-1), and 0.26 part of a compound (S-2) illustrated below. Separately, prepared was a mixed solution of 15 parts of water, and 0.3 part of sodium di(2-ethylhexyl)sulfosuccinate. The two mixed solutions were combined, mixed and emulsified with a homogenizer, and then the resultant emulsion was concentrated at 30° C. under reduced pressure to prepare a colored fine particle dispersion having a nonvolatile component concentration of 14.0%. The volume-average particle size of the colored fine particles in the colored fine particle dispersion was 80 nm. This dispersion is referred to as the colored fine particle dispersion (B-3) hereinafter.

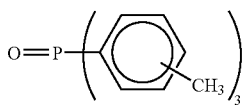

S-1

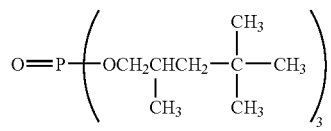

S-2

Preparation Example 4

Preparation of a Colored Fine Particle Dispersion (B-4))

Into 5.0 parts of the hydrophobic high-boiling-point organic solvent (S-1) and 50 parts of ethyl acetate were dissolved 6.4 parts of the oil-soluble dye (the above-illustrated M-2), 7.0 parts of sodium dioctylsulfosuccinate, and 7.8 parts of the dispersible polymer (PA-5) at 70° C. While this solution was stirred with a magnetic stirrer, 400 parts of deionized water were added to this solution to produce an oil-in-water type coarse particle dispersion. Next, this coarse particle dispersion was passed 5 times through a Microfluidizer (manufactured by Microfluidex Inc.) at a pressure of 600 bar so as to be made into fine particles. The produced emulsion was concentrated into 160 parts with a rotary evaporator. The volume-average particle size of the colored fine particles in the colored fine particle dispersion was 45 nm. This dispersion is referred to as the colored fine particle dispersion (B-4) hereinafter.

Preparation Examples 5 to 11

Colored fine particle dispersions of Preparation Example 5, Preparation Examples 6 and 8 to 11, and Preparation Example 7 were produced in the same way as in Preparation Examples 1, 2 and 3, respectively. Dispersible polymers and oil-soluble dyes used are shown in Table 1. About the column "Dispersion", dispersions wherein aggregation was hardly caused and the particle size (volume-average particle size) was 300 nm or less were evaluated as being good.

TABLE 1

| Preparation Example | Dispersion No. | Dispersible polymer | Colorant | Hydrophobic high-boiling-point organic solvent | Dispersion | Solid content (% by mass) | Particle size (nm) | Notes |
|---|---|---|---|---|---|---|---|---|
| 1 | B-2 | PA-5 | M-1 | Not contained | Good | 15 | 22 | (The invention) |
| 2 | B-2 | PA-1 | M-1 | Not contained | Good | 15 | 82 | (The invention) |
| 3 | B-3 | PA-10 | M-1 | Contained | Good | 15 | 77 | (The invention) |
| 4 | B-4 | PA-5 | a-17 | Contained | Good | 15 | 48 | (The invention) |
| 5 | B-5 | PA-5 | a-17 | Not contained | Good | 15 | 48 | (The invention) |
| 6 | B-6 | PA-1 | a-17 | Not contained | Good | 15 | 75 | (The invention) |
| 7 | B-7 | PA-9 | a-17 | Contained | Good | 15 | 73 | (The invention) |
| 8 | B-8 | PA-1 | C-114 | Not contained | Good | 15 | 80 | (The invention) |
| 9 | B-9 | PA-9 | a-17 | Not contained | Good | 15 | 69 | (The invention) |
| 10 | B-9 | PBA | M-1 | Not contained | Good | 15 | 74 | (Comparative Example) |
| 11 | B-9 | PBMA | M-1 | Not contained | Good | 15 | 74 | (Comparative Example) | a-7: compound a-7 recited in US 2002/0107301 A1;
a-17: compound a-17 recited in US 2002/0107301 A1
C-114: compound C-114 recited in US 2002/0107301 A1
PBA: polybutyl acrylate;
PBMA: polybutyl methacrylate

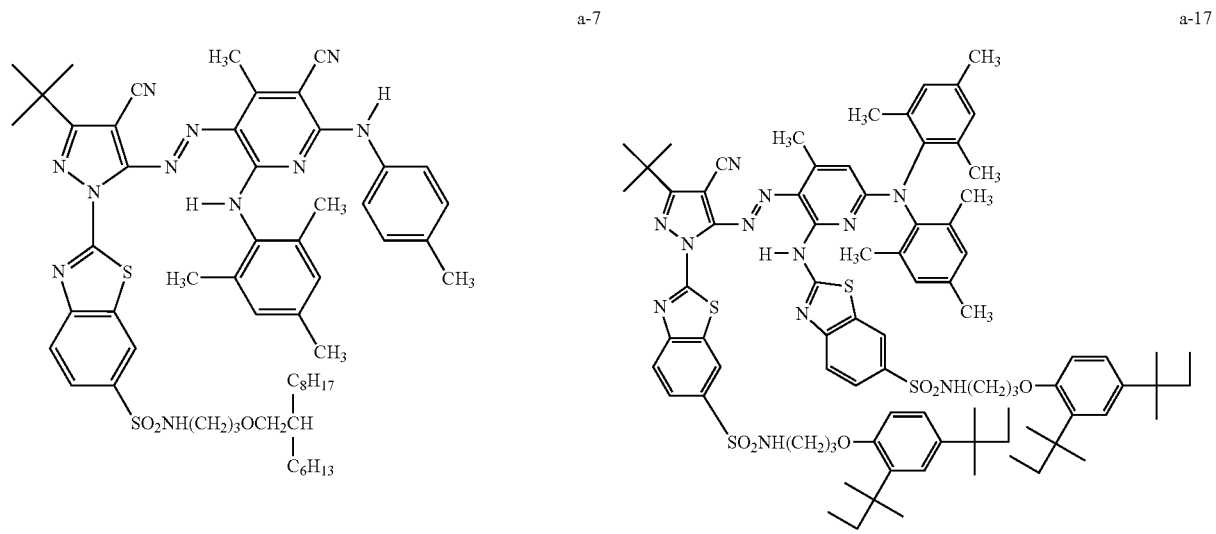

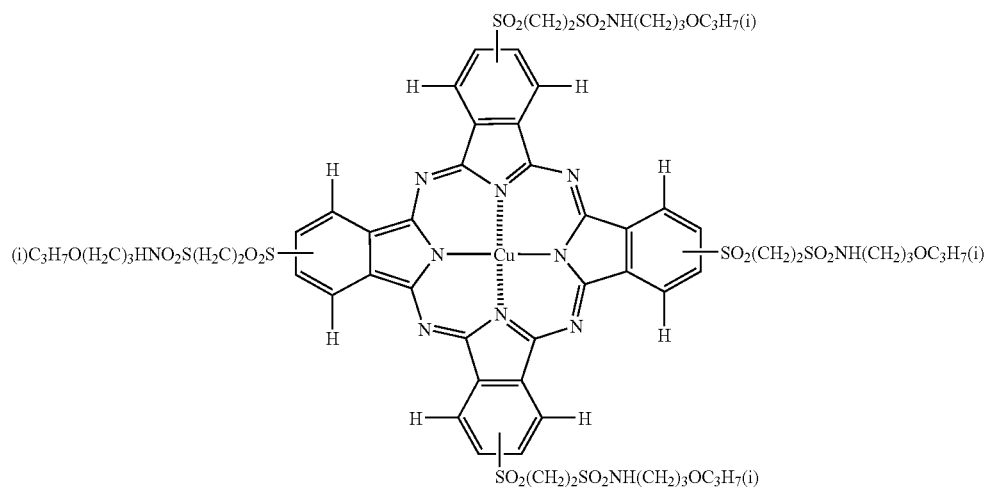

C-114

As is evident from the results shown in Table 1, in Example 1, colored fine particle dispersions which contained fine particles having small particle sizes and had no aggregation were produced.

Example 2

<Preparation of an Ink 01>

The following components were mixed and then the mixture was filtrated with a filter having pores of 0.45 μm diameter to prepare an aqueous ink 01 for ink-jet recording.
Colored fine particle dispersion (B-1): 50 parts
Diethylene glycol: 5 parts
Glycerin: 18 parts
Diethanolamine: 1 part
Olfine E1010: 0.9 g
Water: up to 100 parts <Preparation of an Ink 02>

An aqueous ink 02 for ink-jet recording was prepared in the same way for preparing the ink 01 except that the colored fine particle dispersion (B-1) was replaced with the colored fine particle dispersion (B-2) prepared in Preparation Example 2 of Example 1.

<Preparation of an Ink 03>

The following components were mixed and then the mixture was filtrated with a filter having pores of 0.45 μm diameter to prepare an aqueous ink 03 for ink-jet recording.
Colored fine particle dispersion (B-3): 50 parts
Diethylene glycol: 5 parts
Triethylene glycol monobutyl ether: 2 parts
Glycerin: 16 parts
Diethanolamine: 1 part
Single-end ester of polyethylene glycol (the average number of recurring ethylene oxide chains: 10) esterified with 2-butyloctanoic acid: 1 g
Water: up to 100 parts <Preparation of Inks 04 to 11>

Aqueous inks 04 to 11 for ink-jet recording were prepared in the same way for preparing the inks 01 except that the colored fine particle dispersion (B-1) was replaced with each of the colored fine particle dispersion (B-4) to (B-11) prepared in Preparation Examples 4 to 11 of Example 1.

<Preparation of an Ink 20>

The following components were mixed and then the mixture was filtrated with a filter having pores of 0.45 μm diameter to prepare a aqueous ink 20 for ink-jet recording.

Water-soluble dye DD-1, illustrated below: 4 parts
Diethylene glycol: 8 parts
Triethylene glycol monobutyl ether: 7 parts
Glycerin: 10 parts
Diethanolamine: 1 part
Olfine E1010: 0.2 g
Water: up to 100 parts

DD-1

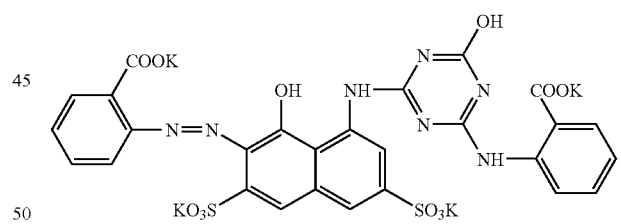

—Image Recording and Evaluation—

A cartridge of an ink-jet printer MC-2000 (manufactured by Seiko Epson Corp.) was filled with each of the prepared inks 01 to 11 and 20, and this printer was used to record images on plain paper for PPC and ink-jet printing photo glossy paper EX (manufactured by Fuji Photo Film Co., Ltd.). The evaluations were then made. The following evaluation results are shown in Table 2 described below.

<Printing Performance Evaluation>

Regarding each of the inks, the cartridge was set in the printer, and then it was checked whether the ink was jetted out from all nozzles or not. Images were outputted onto 10 pieces of A4 paper. The disorder of the images was evaluated on the basis of the following criterion:

A: From the start of the printing to the end thereof, no disorder of printed images was generated.
B: From the start of the printing to the end thereof, the disorder of printed images was often generated.
C: From the start of the printing to the end thereof, printed images were disordered.

<Paper Dependency Evaluation>

Regarding each of the inks, the color tone of the image formed on the photo glossy paper was compared with that of the image formed on the plain paper for PPC. The case that a difference was hardly generated between the two images was evaluated as being good (A). The case that a difference between the two was small was evaluated as being permissible (B). The case that a difference between the two was large was evaluated as being poor (C).

<Water Resistance Evaluation>

Regarding each of the inks, the photo glossy paper on which the image was formed was dried at room temperature for 1 hour, immersed in water for 30 seconds, and then naturally-dried at room temperature. The generation of bleeding of the ink was observed. The case that no bleeding was generated was evaluated as being good (A), the case that slight bleeding was generated was evaluated as being permissible (B), and the case that bleeding was considerably generated was evaluated as being poor (C).

<Abrasion Resistance Evaluation>

Regarding each of the inks, after 30 minutes from the time of printing the image on the photo glossy paper, the image was rubbed with an easer, which was reciprocated 10 times. Change in the image was observed. The case that no fall in the image density was caused was evaluated as being as good (A), the case that a slight fall in the density was evaluated as being permissible (B), and the case that a fall in the density was considerable was evaluated as being as poor (C).

<Light Fastness Evaluation>

Regarding each of the inks, a weather meter (Atlas C. 165) was used to radiate xenon light (85000 lx) onto the photo glossy paper on which the image was formed for 4 days. A reflection density meter (X-Rite 310 TR) was used to measure the densities of the image before and after the irradiation with the xenon light. The result was evaluated on the basis of the dye remaining ratio thereof. The reflection density was measured at three points of densities of 1, 1.5 and 2.0. The case that the dye remaining ratio was 80% or more about all of the densities was evaluated as being good (A). The case that the ratio was less than 80% about the one or two points was evaluated as being permissible (B). The case that the ratio was less than 80% in all of the densities was evaluated as being poor (C).

<Ozone Resistance>

Regarding each of the inks, the sample was stored at an ozone concentration of 1.0 ppm for 3 days. The densities before and after the storage were measured with the X-rite 310 to obtain the dye remaining ratio. The result was then evaluated.

The case that the dye remaining ratio was 90% or more, the case that the ratio was from 89 to 80%, the case that the ratio was from 79 to 70%, the case that the ratio was from 69 to 50%, and the case that the ratio was less than 49% were evaluated as being the best (A), the second best (B), middle (C), the second worst (D), and the worst (E), respectively.

TABLE 2

| Ink No. | Colored fine particle dispersion | Dispersible polymer | Printing performance | Paper dependency | Water resistance | Abrasion resistance | Light fastness | Ozone resistance | Notes |
|---|---|---|---|---|---|---|---|---|---|
| 01 | B-1 | PA-5 | A | A | A | A | A | A | (The invention) |
| 02 | B-2 | PA-1 | A | A | A | A | A | A | (The invention) |
| 03 | B-3 | PA-10 | A | A | A | A | A | A | (The invention) |
| 04 | B-4 | PA-5 | A | A | A | A | A | A | (The invention) |
| 05 | B-5 | PA-5 | A | A | A | A | A | A | (The invention) |
| 06 | B-6 | PA-1 | A | A | A | A | A | A | (The invention) |
| 07 | B-7 | PA-9 | A | A | A | A | A | A | (The invention) |
| 08 | B-8 | PA-1 | A | A | A | A | A | A | (Comparative Example) |
| 09 | B-9 | PA-9 | A | A | A | A | A | A | (The invention) |
| 10 | B-10 | PBA | B | A | A | A | A | A | (Comparative Example) |
| 11 | B-11 | PBMA | B | A | A | C | A | A | (Comparative Example) |
| 20 | Not contained | Not contained | A | B | C | A | C | E | (Comparative Example) |

As is evident from the results shown in Table 2, the ink 11 was poor in abrasion resistance since the Tg thereof was higher than 0° C. The ink 10 was excellent in abrasion resistance since the Tg was 0° C. or lower, but the ink 10 was poor in printing performance since the ink contained no hydrophilic polymer. The ink-jet recording inks according to the invention were excellent in printing performance, water resistance, high-level abrasion resistance, light fastness, dark heat hardness and ozone resistance, and had no paper dependency.

Example 3

A set of 4-color inks was produced as described below, and full color images were recorded. In the same way as in Example 2, the inks were evaluated.

<Cyan Ink>

The ink 08 (containing C-114 Dye) of Example 2 was used.

<Yellow ink>

Prepared was a mixed solution of 3 parts of ethyl acetate, 0.5 part of cyclohexanone, 1.4 parts of the dispersible polymer (PA-1), and 0.6 part of the oil-soluble dye (Y-120).

Separately, prepared was a mixed solution of 15 parts of water, 0.2 part of petroleum sulfonate (trade name: Petronate HL, manufactured by Witoco Co.), and 0.4 part of an Emarl 20C (manufactured by Kao Corp.). The two mixed solution were combined, mixed and emulsified with a homogenizer, and then the resultant emulsion was concentrated at 30° C. under reduced pressure to prepare a colored fine particle dispersion having a solid concentration of 16%.

The resultant colored fine particle dispersion was used to prepare a yellow ink (ink No. 20) in the same way as in the preparation of the ink 01 of Example 2.

<Magenta Ink>

The ink 02 (containing M-2 Dye) of Example 2 was used.

<Black Ink>

A black ink was produced in the same way as in the preparation of the yellow ink except that 0.6 part of the oil-soluble dye (Y-120) was replaced with 0.39 part of the oil-soluble (C-114), 0.27 part of the colorant Y-120, and 0.24 part of the colorant M-1.

(Image Recording and Evaluation)

The produced ink set was evaluated in the same way as in Example 2. The drying property evaluation, the fine-line bleeding evaluation, and the abrasion resistance thereof were performed as follows.

<Drying Property Evaluation>

Immediately after an image was printed, the image was touched with fingers, and then generated stains were evaluated with the naked eye.

<Fine-line Bleeding Evaluation>

Fine lines in yellow, magenta, cyan and black colors were printed with the inks, and the fine lines were evaluated with the naked eye.

The inks according to the invention were excellent in printing performance, water resistance, high-level abrasion resistance, light fastness, dark heat hardness and ozone resistance, had no paper dependency, and gave no bleeding to the fine lines.

Example 4

Each of ink-jet recording inks 30 to 36 was prepared in the same way as in the preparation of the yellow ink in Example 3 except that the oil-soluble dye (Y-120) was replaced with each dye in Tables 3 and 4. All of the inks were good (A) in printing performance, paper dependency, water resistance, abrasion resistance, light fastness, dark heat hardness and ozone resistance except stability.

<Stability>

About each of the inks, the ink was stored at 25° C. for 7 days, and then the state ink was evaluated on the basis of 0.45 μm filter filtrating property.

The case that the ink was not changed and the filter filtrating property thereof was good was evaluated as being good (A), the case that no cloudiness or precipitation was generated but the filtrating property was somewhat poor was evaluated as being permissible (B), and the case that cloudiness or precipitation was generated was evaluated as being poor (C).

TABLE 3

| Ink | Oil-soluble due | V value | SP value | Stability | Notes |
|---|---|---|---|---|---|
| 30 | Y-156 | 804 | 20.9 | B | The invention: the SP value was smaller than the recommended value. |
| 31 | Y-157 | 788 | 21.0 | A | The invention |
| 32 | Y-158 | 688 | 21.6 | A | The invention |
| 20 | Y-120 | 486 | 25.3 | A | The invention |
| 33 | Y-101 | 350 | 26.5 | B | The invention: the SP value was larger than the recommended value. |

TABLE 4

| Ink | Oil-soluble due | SP value | V value | Stability | Notes |
|---|---|---|---|---|---|
| 34 | Y-116 | 20.5 | 267 | B | The invention: the V value was smaller than the recommended value. |
| 35 | Y-117 | 24.4 | 303 | A | The invention |
| 31 | Y-157 | 21.0 | 788 | A | The invention |
| 36 | Y-159 | 21.0 | 817 | B | The invention: the V value was larger than the recommended value. |

As is evident from the results shown in Tables 3 and 4, the stability of ink is related to the solubility parameter SP value ($J^{0.5}/cm^{1.5}$) and the molecular volume V value ($cm^3/mol$) of oil-soluble dye. In the case of the oil-soluble dyes about which the V values shown in Table 3 were in a preferable range of 810 to 270, the ink 30 having a smaller SP value than 21 and the ink 33 having a larger SP value than 26 tended to be poor in stability. In the case of the oil-soluble dyes about which the SP values shown in Table 4 were in a preferable range of 26 to 21, the ink 34 having a smaller V value than 270 and the ink 36 having a larger V value than 810 tended to be poor in stability. It can be understood that the case that the solubility parameter SP value of the oil-soluble dye is from 26 to 21 and the molecular volume V value thereof is from 810 to 270 is particularly excellent in ink stability.

According to the invention, it is possible to provide a colored fine particle dispersion which has good handling performance, low odor-generating property and high safety; which is suitable for aqueous ink for writing, aqueous ink for printing and ink for information-recording; which is small in the particle size of dispersed particles; and which is excellent in dispersion stability and storage stability.

According to the invention, it is possible to provide an ink-jet recording ink which is suitable for thermal piezoelectric, electric field, and acoustic ink-jet methods; which has good handling performance, low odor-generating property and high safety; which is small in the particle size of dispersed particles; which is excellent in dispersion stability and storage stability so as to decrease the generation of clogging in the tips of nozzles; which has no dependency upon kinds of paper so as to exhibit excellent color forming property and color tones when the ink is used to print images on paper selected at will; which is excellent in ink-infiltrating ability into photographic image-quality paper; which gives good water resistance, in particular, good image storability and abrasion resistance to images printed with the ink; and makes high-density and high-quality recording possible.

According to the invention, it is possible to provide an ink-jet recording method which has good handling performance, low odor-generating property and high safety; which overcomes poor jetting based on clogging of the tips of nozzles; which has no dependency upon kinds of paper so as to exhibit excellent color forming property and color tones when the ink is used to print images on paper selected at will; which is excellent in ink-infiltrating ability into photographic image-quality paper; which gives good water resistance, in particular, good image storability and abrasion resistance to images printed with the ink; and which makes high-density and high-quality recording possible.

What is claimed is:

1. A colored fine particle dispersion, wherein colored fine particles comprising a dispersible polymer having both of a hydrophilic polymer moiety and a hydrophobic polymer moiety which has a glass transition temperature (Tg) of 0° C. or less and an oil-soluble dye are dispersed in an aqueous medium,
    wherein an oxidation potential of the oil-soluble dye is nobler than 1.0V (vs SCE),
    wherein the oil-soluble dye is represented by the following formula (Y-1):

A-N=N—B  Formula(Y-1)

in the formula (Y-1) A and B each independently represent a heterocyclic group which may have a substituent.

2. A colored fine particle dispersion according to claim 1, wherein the hydrophobic polymer moiety constitutes 60 to 90% by mass of the dispersible polymer, and the hydrophilic polymer moiety constitutes 10 to 40% by mass of the dispersible polymer.

3. A colored fine particle dispersion according to claim 1, wherein the hydrophilic polymer moiety is an anionic polymer or a nonionic polymer.

4. A colored fine particle dispersion according to claim 1, wherein a solubility parameter (an SP value) of the oil-soluble dye is from 26 to 21 $J^{0.5}/cm^{1.5}$, and a molecular volume (a V value) thereof is from 810 to 270 $cm^3/mol$.

5. A colored fine particle dispersion according to claim 2, wherein the hydrophilic polymer moiety is an anionic polymer or a nonionic polymer.

6. A colored fine particle dispersion according to claim 5, wherein a solubility parameter (an SP value) of the oil-soluble dye is from 26 to 21 $J^{0.5}/cm^{1.5}$, and a molecular volume (a V value) thereof is from 810 to 270 $cm^3/mol$.

7. An ink comprising a colored fine particle dispersion wherein colored fine particles comprising a dispersible polymer having both of a hydrophilic polymer moiety and a hydrophobic polymer moiety which has a glass transition temperature (Tg) of 0° C. or less and an oilsoluble dye are dispersed in an aqueous medium, wherein the oil-soluble dye is represented by the following formula (Y-1):

A-N=N—B  Formula(Y-1)

in the formula (Y-1), A and B each independently represent a heterocyclic group which may have a substituent.

8. An ink according to claim 7, wherein the hydrophobic polymer moiety constitutes 60 to 90% by mass of the dispersible polymer, and the hydrophilic polymer moiety, which includes an anionic polymer or a nonionic polymer, constitutes 10 to 40% by mass in the dispersible polymer.

9. An ink according to claim 8, wherein an oxidation potential of the oil-soluble dye is nobler than 1.0 V (vs SCE).

10. An ink according to claim 9, wherein a solubility parameter (an SP value) of the oil-soluble dye is from 26 to 21 $J^{0.5}/cm^{1.5}$, and a molecular volume (a V value) thereof is from 810 to 270 $cm^3/mol$.

11. An ink-jet recording method for recording an image onto a recording material with an ink comprising a colored fine particle dispersion wherein colored fine particles comprising a dispersible polymer having both of a hydrophilic polymer moiety and a hydrophobic polymer moiety which has a glass transition temperature (Tg) of 0° C. or less and an oil-soluble dye are dispersed in an aqueous medium, wherein the oil-soluble dye is represented by the following formula (Y-1):

A-N=N—B  Formula(Y-1)

in the formula (Y-1), A and B each independently represent a heterocyclic group which may have a substituent.

12. An ink-jet recording method according to claim 11, wherein the hydrophobic polymer moiety constitutes 60 to 90% by mass of the dispersible polymer, and the hydrophilic polymer moiety which includes an anionic polymer or a nonionic polymer constitutes 10 to 40% by mass in the dispersible polymer.

13. An ink-jet recording method according to claim 12, wherein an oxidation potential of the oil-soluble dye is nobler than 1.0 V (vs SCE).

14. An ink-jet recording method according to claim 13, wherein asolubility parameter (an SP value) of the oil-soluble dye is from 26 to 21 $J^{0.5}/cm^{15}$, and a molecular volume (a V value) thereof is from 810 to 270 $cm^3/mol$.

15. An ink-jet recording method according to claim 14, wherein a recording paper comprising a support and an ink-receiving layer which is provided on the support and includes porous inorganic fine particles is used as the recording material.

16. An ink-jet recording method according to claim 15, wherein the porous inorganic fine particles are porous silica.

17. A colored fine particle dispersion according to claim 1, wherein the oil-soluble dye is represented by the following Formula (Y-II):

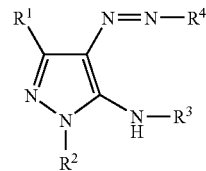

in the formula (Y-II), $R^1$ and $R^3$ each independently represents a hydrogen atom, or a cyano, alkyl, cycloalkyl, aralkyl, alkoxy, alkylthio, arylthio, aryl or ionic hydrophilic group; $R^2$ represents a hydrogen atom, or an alkyl, cycloalkyl, aralkyl, carbamoyl, acyl, aryl or heterocyclic group; and $R^4$ represents a heterocycle.

* * * * *